(12) United States Patent
Brown et al.

(10) Patent No.: US 9,800,711 B2
(45) Date of Patent: Oct. 24, 2017

(54) SYSTEM, METHOD AND DEVICE-READABLE MEDIUM FOR COMMUNICATION EVENT INTERACTION WITHIN A UNIFIED EVENT VIEW

(71) Applicant: BlackBerry Limited, Waterloo (CA)

(72) Inventors: David Andrew Brown, Kitchener (CA); Maria Christina Nathalie Freyhult, Malmö (SE); Umesh Miglani, North Chelmsford, MA (US)

(73) Assignee: BlackBerry Limited, Waterloo, Ontario (CA)

( * ) Notice: Subject to any disclaimer, the term of this patent is extended or adjusted under 35 U.S.C. 154(b) by 372 days.

(21) Appl. No.: 14/340,148

(22) Filed: Jul. 24, 2014

(65) Prior Publication Data
US 2016/0028875 A1    Jan. 28, 2016

(51) Int. Cl.
*H04M 1/725* (2006.01)
*G06F 3/0482* (2013.01)
*G06F 3/0484* (2013.01)
*G06F 3/0481* (2013.01)
*G06F 3/0488* (2013.01)

(52) U.S. Cl.
CPC ...... *H04M 1/72547* (2013.01); *G06F 3/0481* (2013.01); *G06F 3/0482* (2013.01); *G06F 3/0488* (2013.01); *G06F 3/04842* (2013.01); *G06F 3/04847* (2013.01); *H04M 2250/22* (2013.01)

(58) Field of Classification Search
CPC ......... G06F 3/0481; G06F 2203/04803; G06F 3/0482
See application file for complete search history.

(56) References Cited

U.S. PATENT DOCUMENTS 6,678,642 B1 * 1/2004 Budge ................ G06F 17/5018
703/1
6,778,642 B1 * 8/2004 Schmidt, Jr. ........ H04M 3/5307
379/67.1

(Continued)

FOREIGN PATENT DOCUMENTS

EP    2584770    4/2013
EP    2631760    8/2013

OTHER PUBLICATIONS

Outlook—add an email reminder https://www.youtube.com/watch?v=XB5-YAs8VqE (uploaded Nov. 3, 2010).*

(Continued)

*Primary Examiner* — Sherrod Keaton
(74) *Attorney, Agent, or Firm* — Rowand LLP

(57) ABSTRACT

A method, electronic device, and device-readable medium are provided for implementing quick actions or additional actions in a unified inbox context. A number of communication event listings are displayed in either a first mode or a second mode. In the first mode, at least one user interface element for invoking a first operation is displayed for each communication event listing. In the second mode, at least one other user interface element for invoking a further operation is included in the communication event listing in addition to a user interface element for invoking the first operation. The user can selectively invoke the second mode from the first mode.

17 Claims, 25 Drawing Sheets

(56) References Cited

U.S. PATENT DOCUMENTS

| | | | |
|---|---|---|---|
| 7,283,808 B2 | 10/2007 | Castell et al. | |
| 7,295,836 B2 | 11/2007 | Yach et al. | |
| 7,466,320 B2 | 12/2008 | Bocking | |
| 7,818,378 B2 | 10/2010 | Buchheit et al. | |
| 7,912,904 B2 | 3/2011 | Buchheit et al. | |
| 8,620,273 B2 | 12/2013 | Maguire et al. | |
| 8,726,171 B1* | 5/2014 | Lachapelle | H04M 1/274558 715/751 |
| 2004/0268265 A1 | 12/2004 | Berger | |
| 2009/0282360 A1* | 11/2009 | Park | G06F 3/0482 715/786 |
| 2012/0290946 A1 | 11/2012 | Schrock et al. | |
| 2013/0097526 A1 | 4/2013 | Stovicek et al. | |
| 2014/0053102 A1* | 2/2014 | Lee | G06F 3/0482 715/810 |
| 2014/0155111 A1 | 6/2014 | Yang et al. | |
| 2014/0282254 A1* | 9/2014 | Feiereisen | G06F 3/04842 715/835 |

OTHER PUBLICATIONS

Outlook—add an email reminder https://www.youtube.com/watch?v=XB5-YAs8VqE ("Outlook" uploaded Nov. 3, 2010).*

Extended European Search Report dated Dec. 22, 2015.

Google Developers, "What are Actions?—Actions in the Inbox", accessed from Internet <https://developers.google.com/gmail/actions/actions/actions-overview>, published at least as early as Oct. 24, 2013, 5 pgs.

Google, "Interact with online services from your inbox", Gmail Help, accessed from Internet <https://support.google.com/mail/answer/3128265?hl=en>, published at least as early as Jul. 21, 2014, 3 pgs.

Nowakowski, M., "New in Labs: Preview Pane", Official Gmail Blog, accessed from Internet <http://gmailblog.blogspot.ca/2011/08/new-in-labs-preview-pane.html>, Aug. 4, 2011, 1 pg.

* cited by examiner

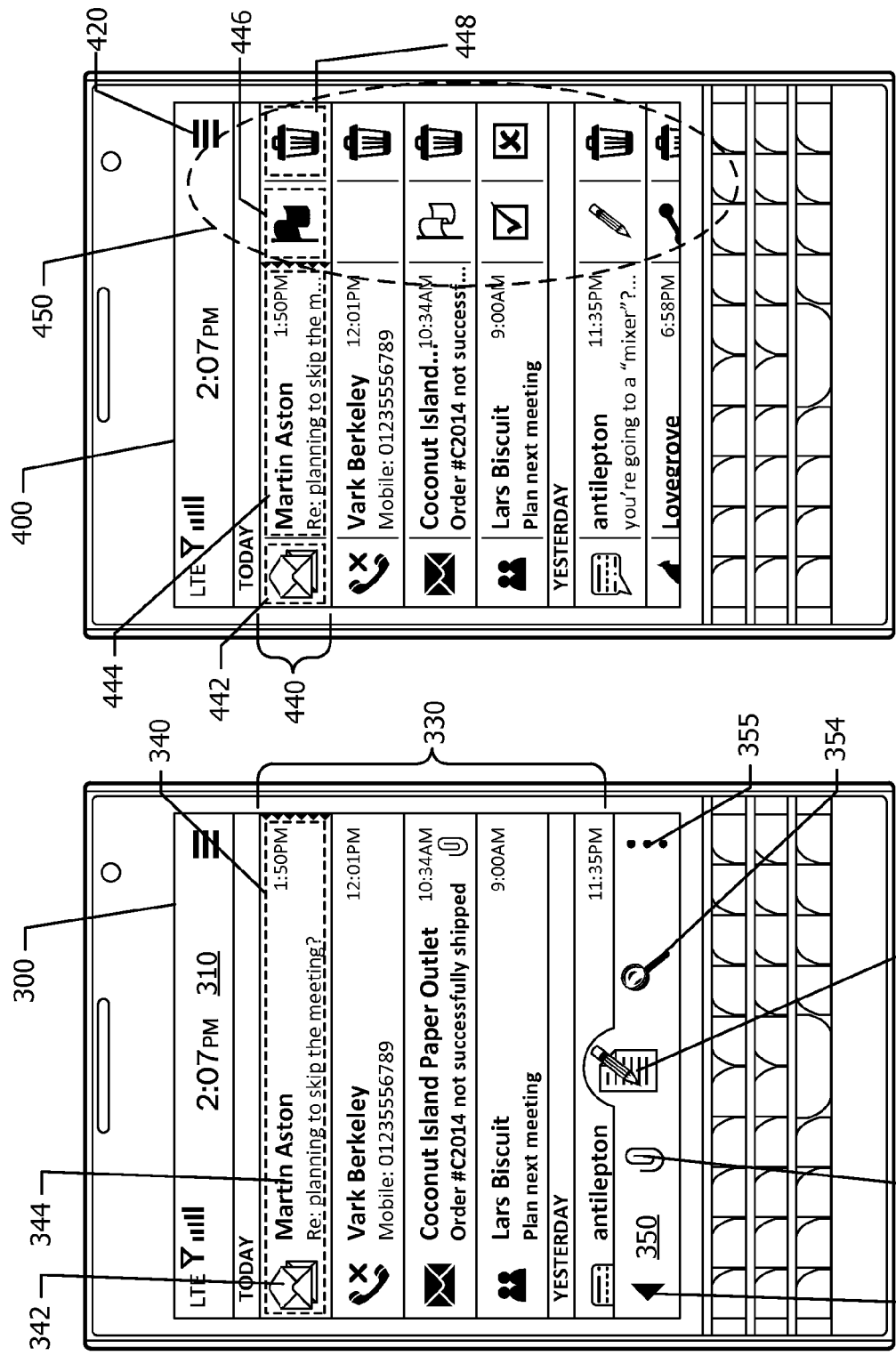

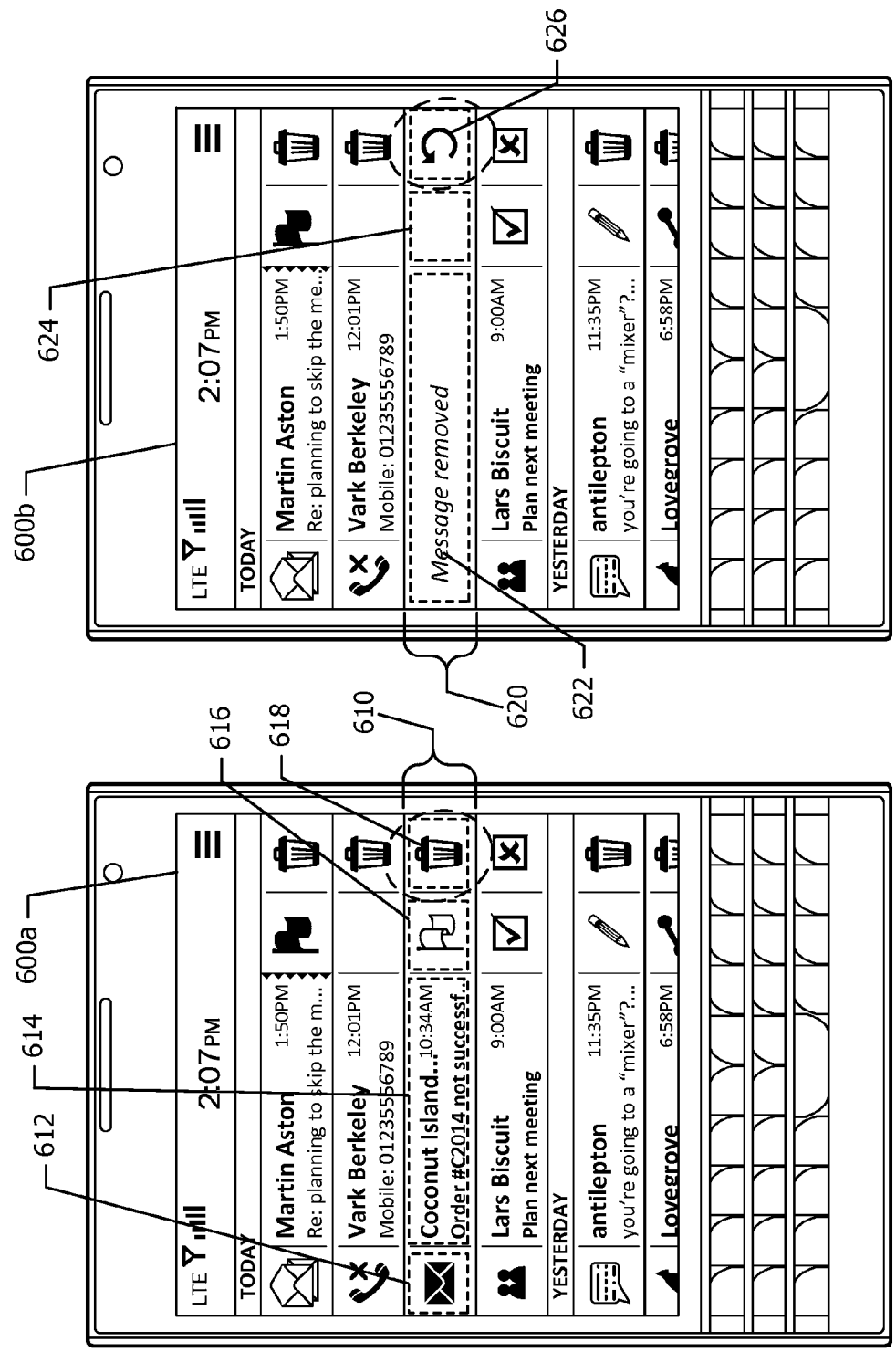

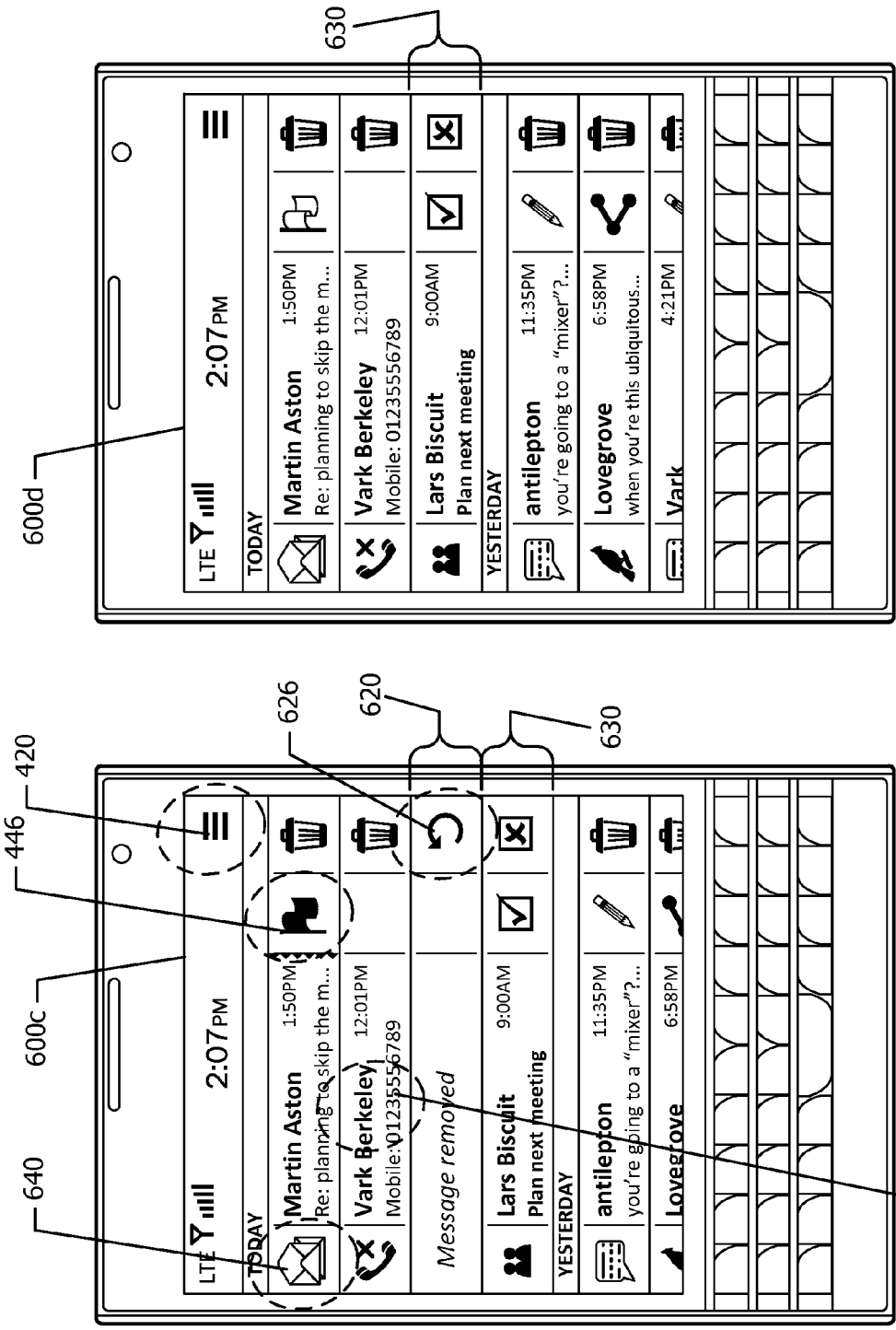

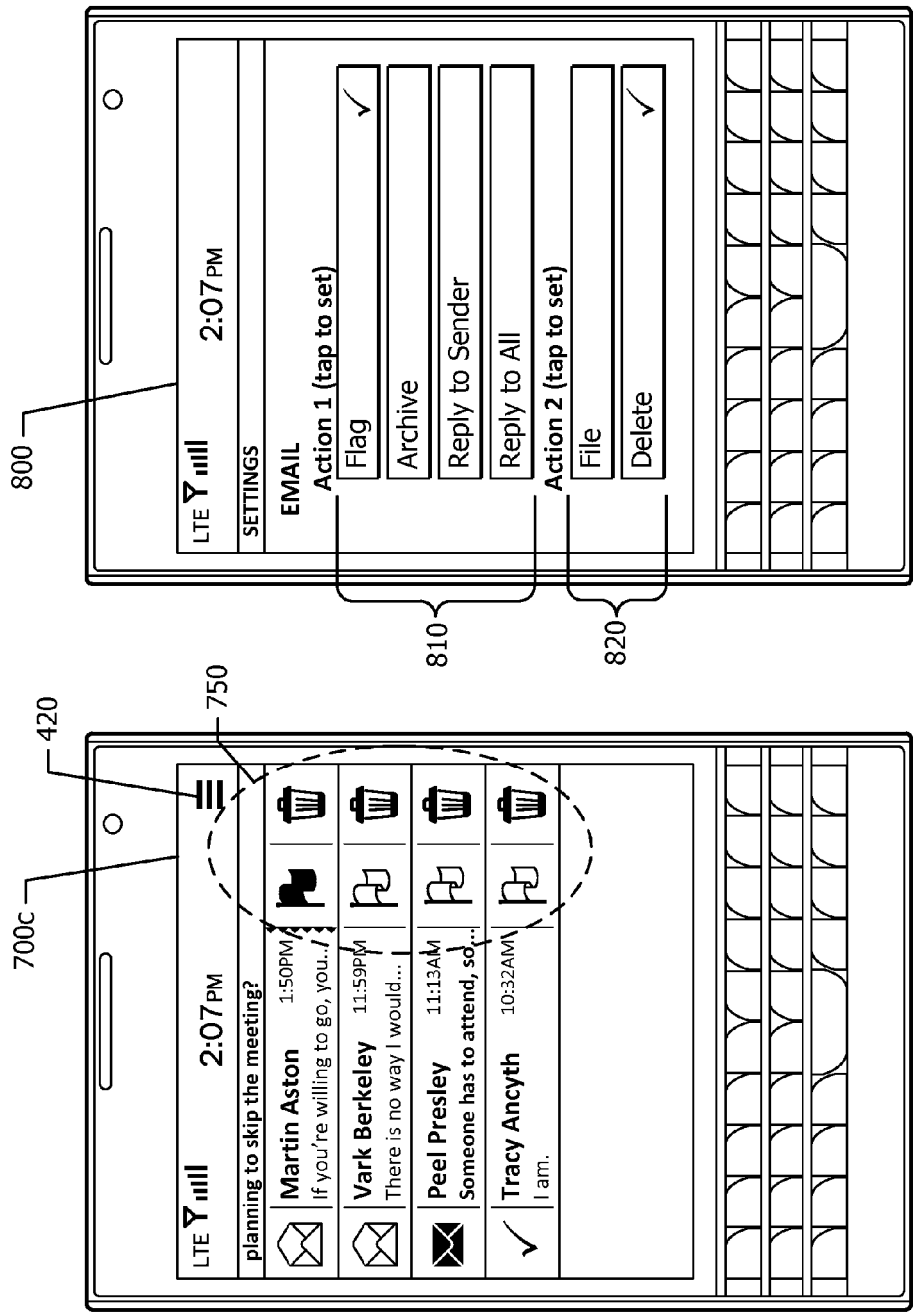

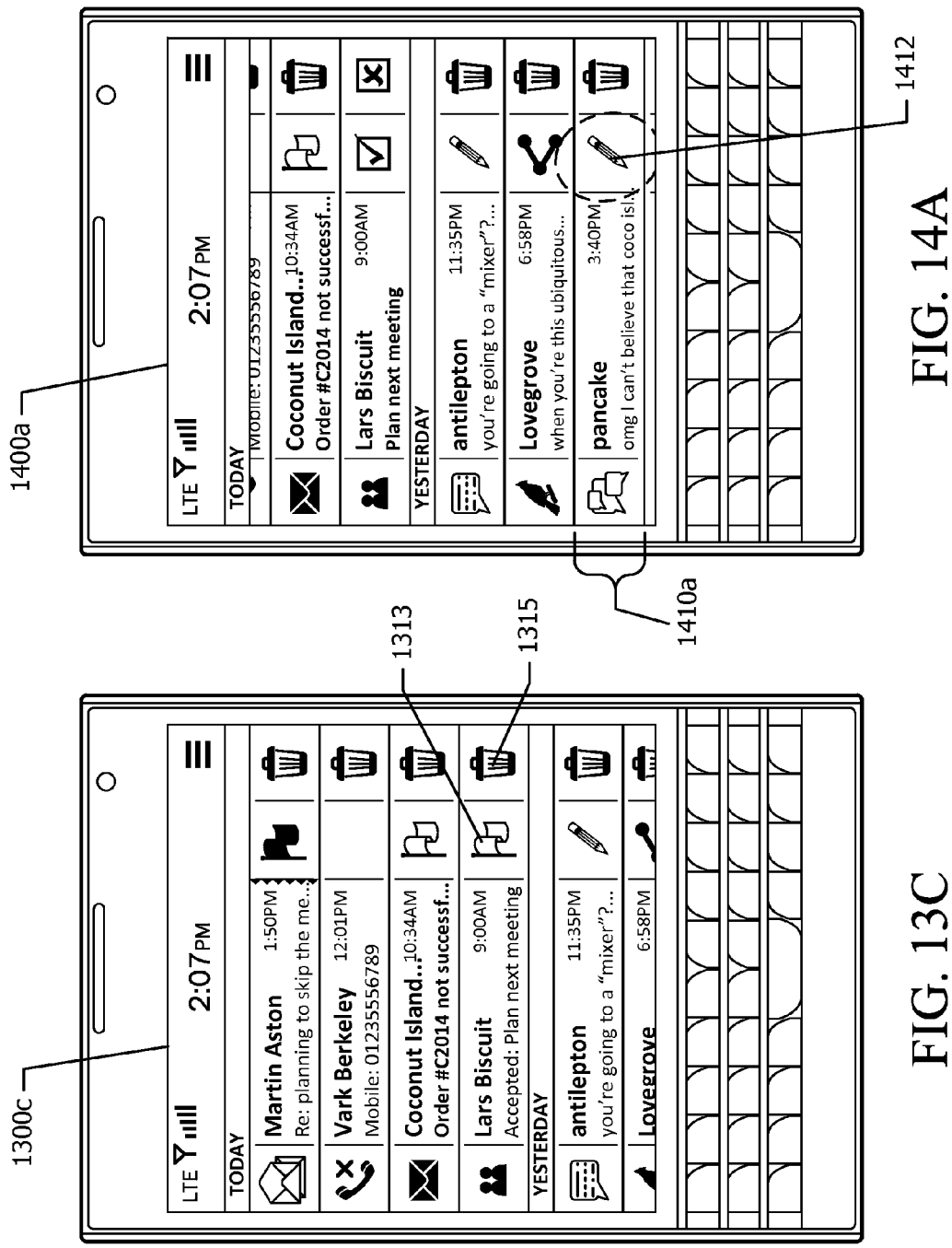

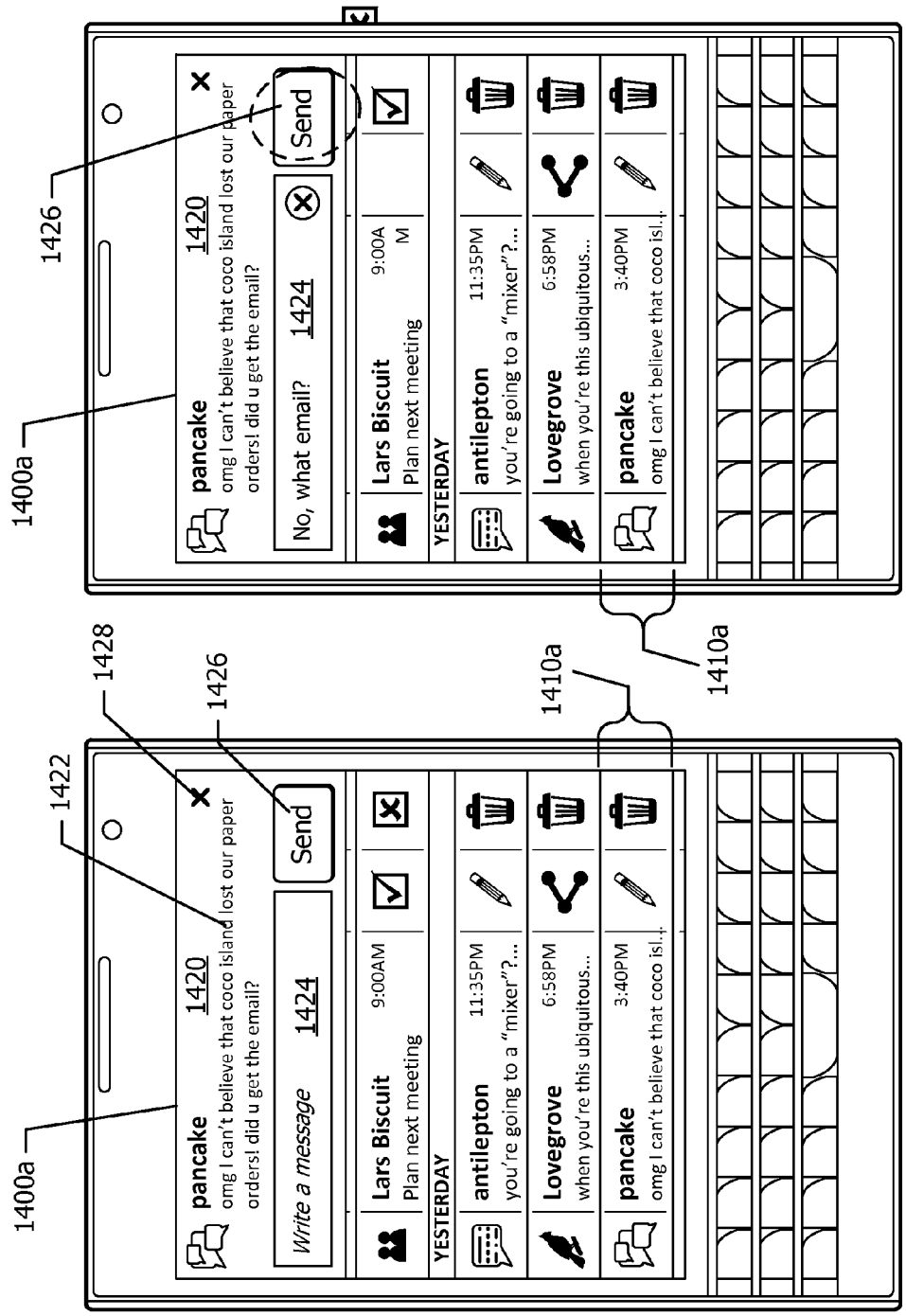

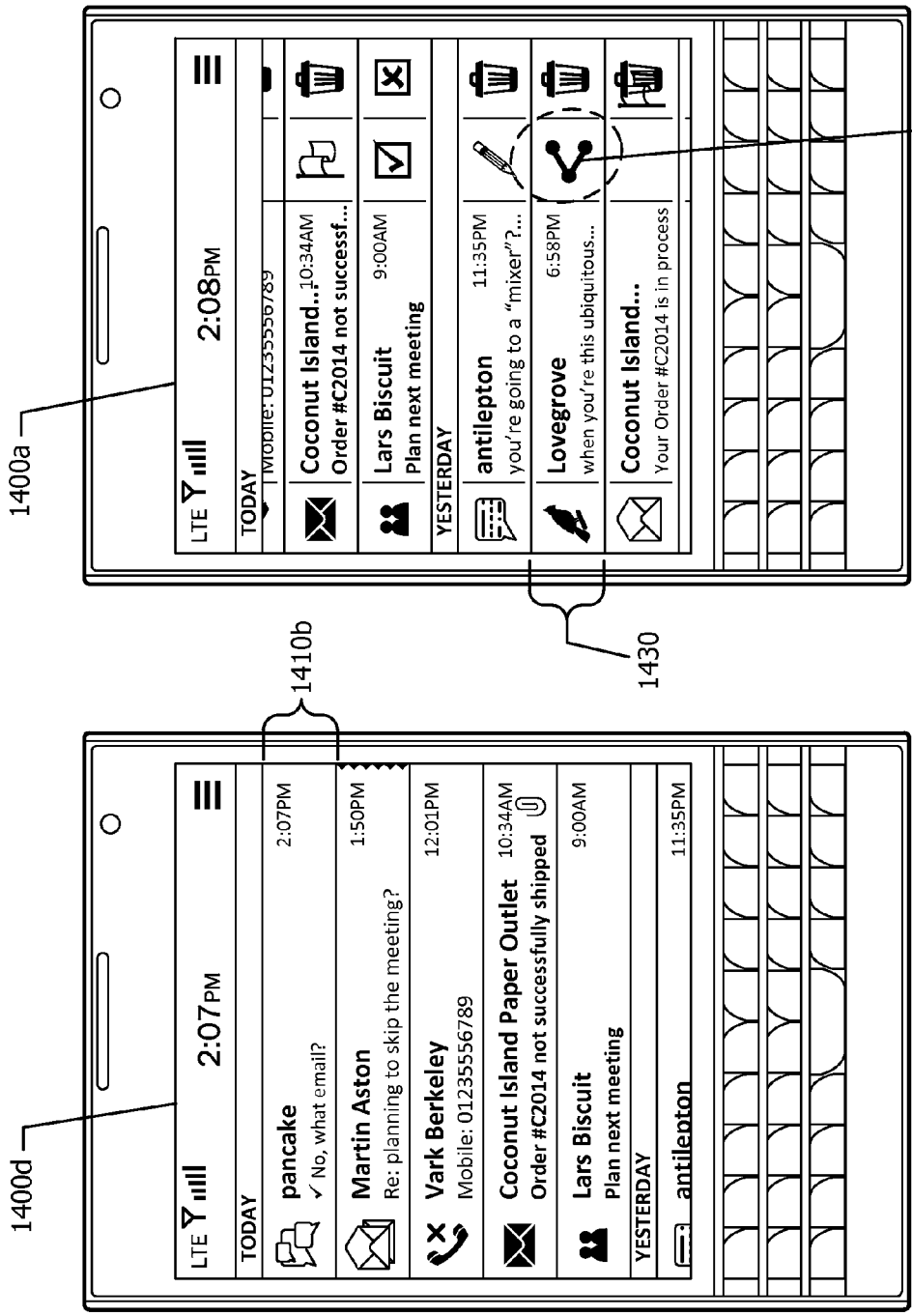

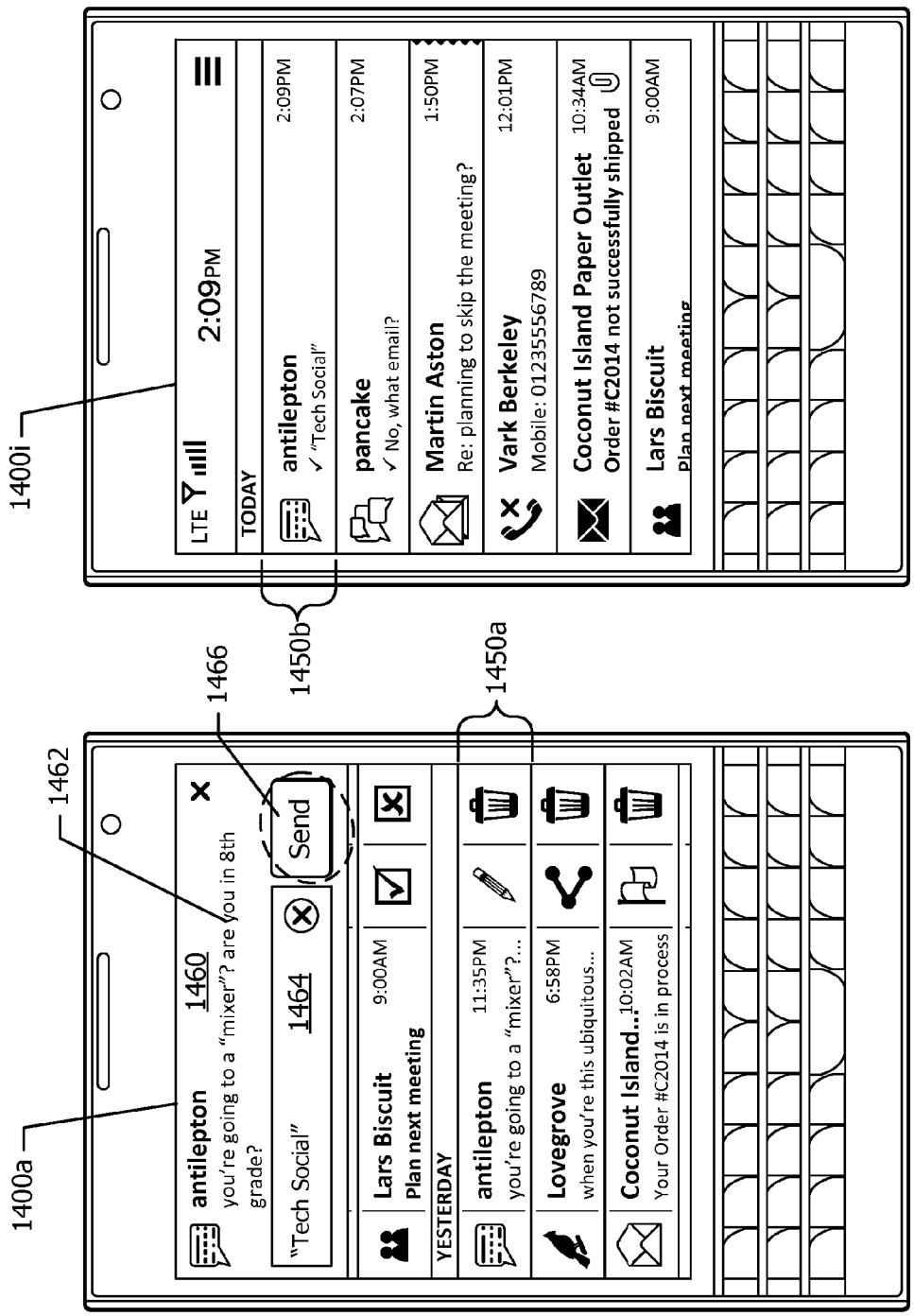

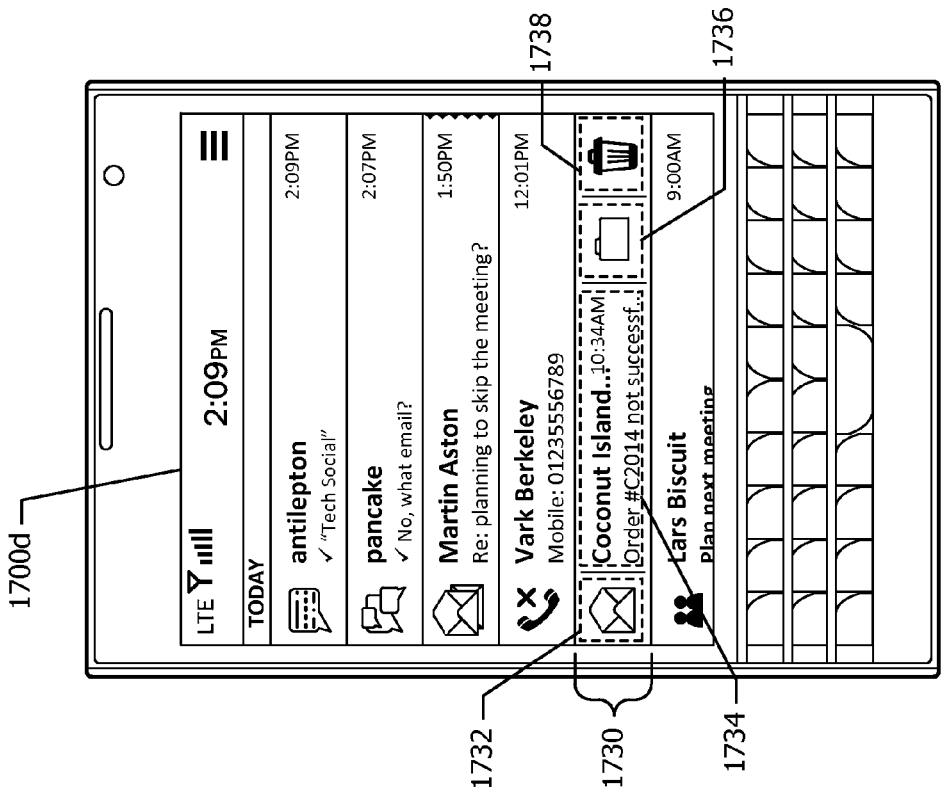
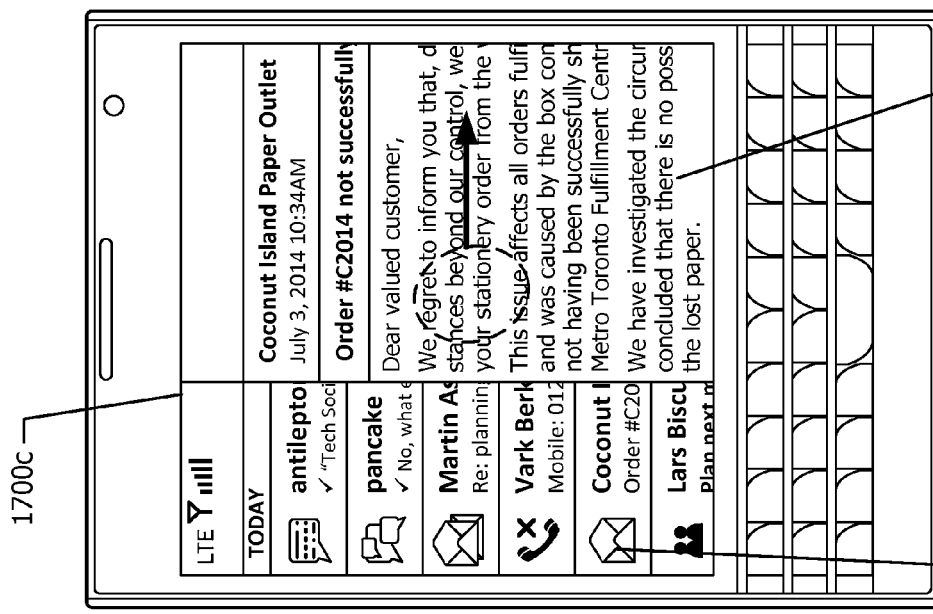
FIG. 17D
FIG. 17C

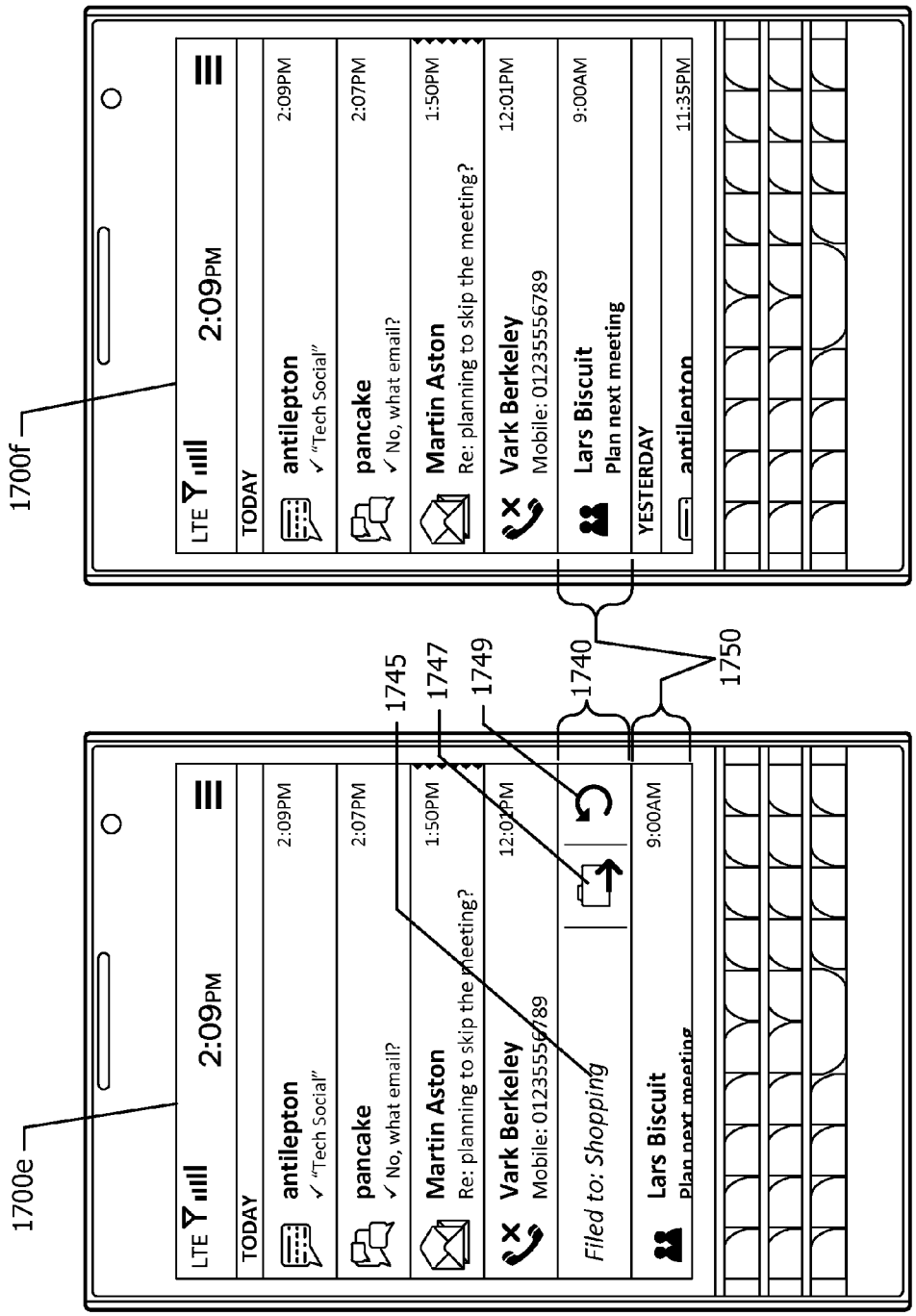

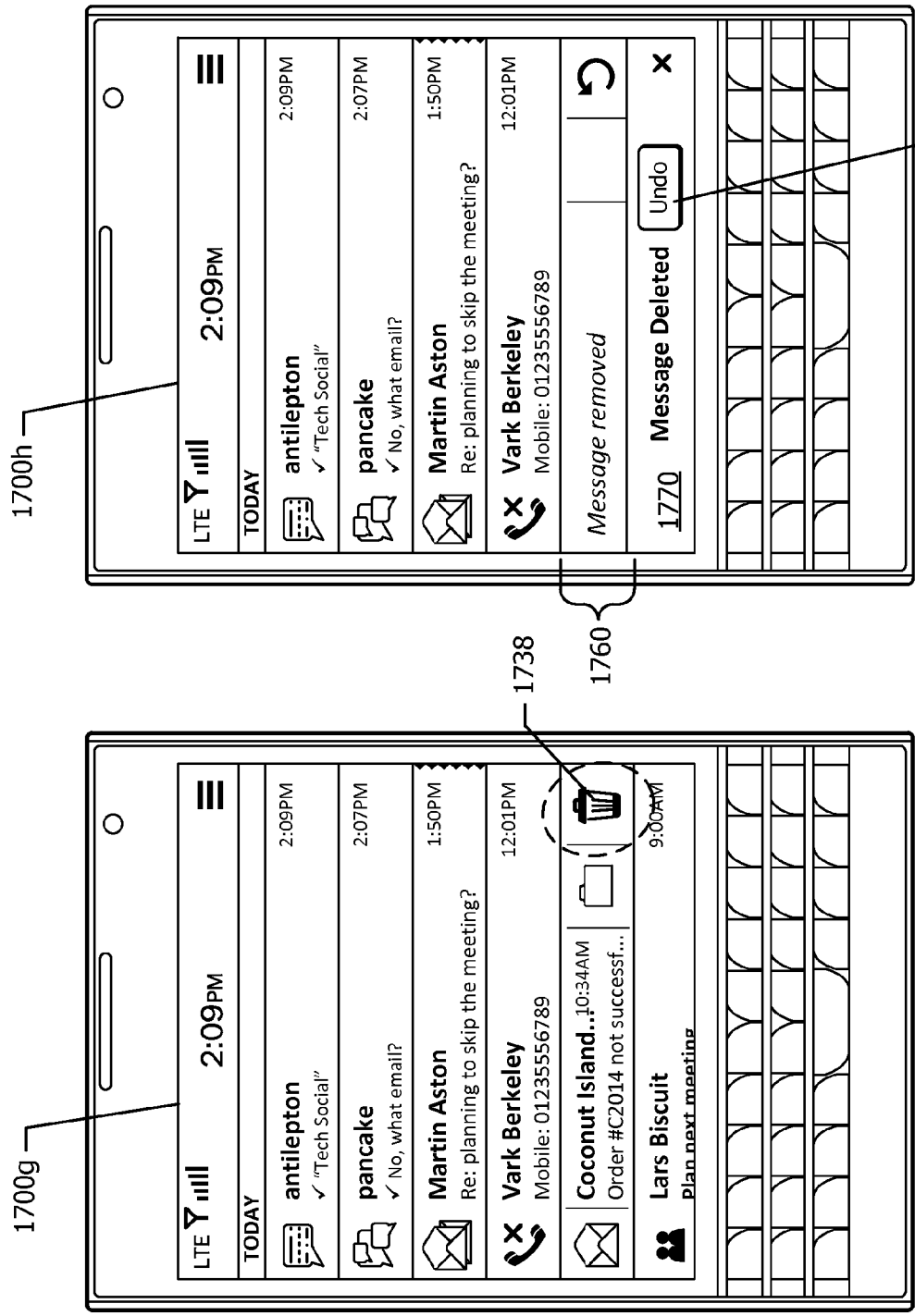

SYSTEM, METHOD AND DEVICE-READABLE MEDIUM FOR COMMUNICATION EVENT INTERACTION WITHIN A UNIFIED EVENT VIEW

BACKGROUND

1. Technical Field

The present application relates generally to a system, method, and device-readable medium for event object interaction or management within a unified event view on a communication device display.

2. Description of the Related Art

Mobile communication devices, such as smartphones, tablets, and mobile devices having hybrid form factors, are adapted for use with multiple messaging services employing different formats and protocols. A communication device may be provisioned for multiple user accounts for even a single message type. Typically, user access to messages of different types or accounts often requires use of a dedicated messaging application for each distinct type and/or account. Therefore, for ease of use, some communication devices are also configured to provide unified access to these different messages in a single view on the device display screen. Such a single view may take the form of a unified inbox, similar to an email inbox, which presents summary information about incoming (and optionally outbound) messages for the user's reference.

As the volume of messages sent and received by users continues to increase, so does the need for prompt and efficient management of message data stores on the communication device. The inbox typically serves as the primary graphical user interface for management operations, but the limited amount of information that can be seen at once onscreen is at odds with the increasing number of incoming messages. In addition, with heavier reliance on touchscreen interfaces and gesture control of mobile devices, the graphical user interface on some mobile platforms has become relatively "cueless", relying on user recollection of particular touch combinations or gestures in order to effectively manage the inbox.

BRIEF DESCRIPTION OF THE DRAWINGS

In drawings which illustrate by way of example only embodiments of the present application.

FIG. 3 is an illustration of a unified event listing view displayable by the electronic device in a first mode.

FIG. 4 is an illustration of the unified event listing view in a second mode.

FIGS. 6A to 6D are further illustrations of the unified event listing view in the second mode executing a delete action.

FIG. 7C is an illustration of the event listing view of FIG. 7B in the second mode.

FIG. 8 is an illustration of a configuration view for configuring operation of the second mode of the unified event listing view.

FIGS. 13A to 13C are illustrations of the unified event listing view in the second mode while carrying out an acknowledgement operation.

FIGS. 14A to 14I are illustrations of the unified event listing view while performing a reply operation.

FIGS. 17A to 17H are illustrations of the unified event listing view before and after display of a message view.

DETAILED DESCRIPTION

Figure 1:
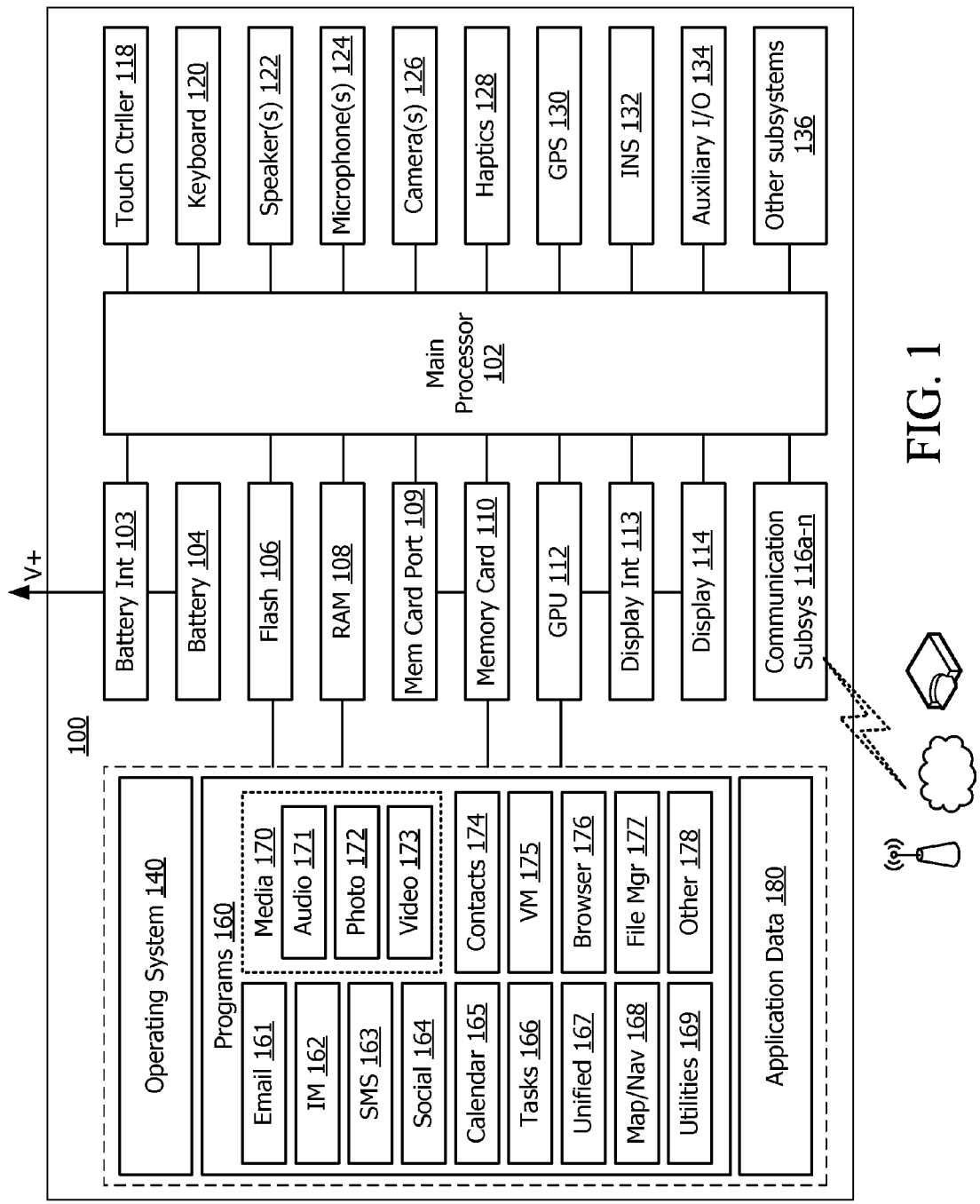
FIG. 1 is a block diagram of an example electronic device for use with the embodiments discussed herein.

The embodiments described herein provide a method, electronic device, system, and non-transitory medium providing certain improvements in the operation of a unified inbox or other message or communication event listing view.

There is provided a method implemented by an electronic device, comprising: displaying, on a display screen, a view comprising a plurality of communication event listings corresponding to a plurality of communication events, the plurality of communication events comprising a plurality of communication event types or a plurality of accounts, the view being initially displayed in a first mode, each displayed listing of the view in the first mode comprising a user interface element for initiating a first action operating on its corresponding communication event; in response to a command to invoke a second mode for the view, displaying the view in the second mode, each displayed listing of the view in the second mode comprising a user interface element for initiating the first action and at least one additional user interface element for initiating an additional action operating on the corresponding communication event, different sets being provided for communication events of different communication event types or different accounts.

In one aspect, the second mode user interface element for initiating the first action is a resized version of the first mode user interface element.

In another aspect, the display screen comprises a touchscreen interface, and each of the first mode user interface element for initiating the first action, second mode user interface element for initiating the first action, and the at least one additional user interface element are each actuatable to initiate their corresponding action by a touch.

In still another aspect, the view is generated by a unified event application executing on the electronic device, and the method further comprises, while in the second mode: detecting actuation of one of the additional user interface elements; and providing a request to a dedicated application to execute the action on the communication event corresponding to the additional user interface element, the dedicated application being associated with the communication event type or account of the communication event.

In yet another aspect, the view is generated by a unified event application executing on the electronic device, and the method further comprises, while in the second mode: detecting actuation of one of the additional user interface elements; storing data for initiating the action associated with the actuated additional user interface element; and on detection of a trigger, providing a request to a dedicated application to execute the action on the communication event corresponding to the additional user interface element, the dedicated application being associated with the communication event type or account of the communication event, the trigger comprising either: actuation of another user interface element in the view; or a command to invoke the first mode in place of the second mode.

In another aspect, each listing, in both the first mode and the second mode, comprises an icon element, the icon element being included in the first mode user interface element but excluded from the second mode user interface element; and in the second mode, the icon element is comprised in a further user interface element for initiating a further action operating on the corresponding communication event. The further action may comprise a toggle between a read state and an unread state.

In yet a further aspect, the first action comprises a viewing operation for the corresponding communication event.

There is also provided a non-transitory electronic device-readable medium bearing code which, when executed by one or more processors of an electronic device, causes the electronic device to implement the foregoing method and variants; and an electronic device, which may be a handheld mobile communication device, configured to implement the foregoing method and variants.

The examples set out below are described and illustrated primarily in the context of a handheld mobile device with a touchscreen interface. FIG. 1 is a block diagram of select components of an example electronic device 100 suitable for use with these examples. It will be understood by those skilled in the art that the components illustrated in FIG. 1 are merely representative of particular aspects of the electronic device 100, and that other components that are typically included in such a device have been excluded in the drawings and this description only for succinctness. Furthermore, those skilled in the art will understand that the device 100 may be successfully used with the various examples described herein even when some components described in relation to FIG. 1 are omitted.

Operation of the electronic device 100 is generally controlled by a main processor or processors 102. The device 100 may be a battery-powered device and would thus include a battery interface 103 connecting to one or more rechargeable batteries 104. The batteries may be removable or non-removable. The interface 103 can include an adaptor for receiving and converting mains power to power the device and/or charge or recharge the battery 104. Data, programs, and other instructions or information can be stored in one of several possible memory components in the device 100, such as flash memory 106, random access memory (RAM) 108, or other storage elements such as a memory card 110 received in an integrated memory card port 109. Typically, software and data components such as the operating system (OS) 140, programs (applications) 160, and application/user data 180 are stored in resident persistent memory such as the flash memory 106, and some components of the OS 140 may be embedded as firmware in integrated memory in the processor 102. However, portions of such components may be temporarily loaded into a volatile store such as the RAM 106, or on the memory card 110.

Communication functions, including data and optionally voice communications, are performed through one or more communication subsystems 116a-n in communication with the processor 102. Other functional components used to accomplish communication functions, such as antennae, decoders, oscillators, digital signal processors, and the like, may be considered to be part of these subsystems. Wireless communication subsystems 116a-n are used to exchange data with wireless networks or other wireless devices in accordance with one or more wireless communications standards. New wireless standards are still being defined, but it is believed that they will have similarities to any network or communication behavior described herein, and the examples described here are intended to be used with any suitable standards that are developed in the future. The wireless link connecting the communication subsystems 116a-n may operate over one or more different radiofrequency (RF) channels according to defined protocols, such as wireless LAN (e.g., one or more of the 802.11™ family of standards), near-field communication, Bluetooth® and the like. The particular design of a communication subsystem is dependent on the communication network with which it is intended to operate.

The electronic device 100 is provided with at least a display output interface 113 that connects to a display screen 114, which is either integrated into the device 100 (particularly if the device 100 is intended to be mobile or portable) or external to the device 100. Graphics data to be delivered to the display screen 114 via the interface 113 is either processed by the main processor 102, or optionally by a separate graphics processing unit (GPU) 112. In some examples, such as those discussed below, the electronic device is a touchscreen-based device in which a combination display screen-touch interface is a primary user interface mechanism, communicating information and presenting graphical user interfaces to the user while also receiving user input that may be converted into instructions for execution by the device 100. In such cases, the display screen 114 may comprise a touchscreen digitizer layered on the actual display component (e.g. liquid crystal display) of the display screen 114, in communication with a touchscreen controller 118 that processes detected touches and gestures on the touchscreen. The construction and operation of a suitable display screen and/or touchscreen interface will be understood by those skilled in the art. In some implementations, the electronic device 100 is configured to output data to an external monitor or panel, tablet, television screen, projector, or virtual retinal display, via a data port or transmitter, such as a Bluetooth® transceiver, USB port, HDMI port, DVI port, and the like. Generally, as referred to herein, "display", "display screen", and "display interface" are intended to encompass all implementations with integrated and external display screens unless expressly or implicitly stated otherwise.

The processor 102 also interacts with additional subsystems, if present. This can include I/O devices, sensors, and other components such as a keyboard 120, speaker(s) 122, microphone(s) 124, camera(s) 126, haptics module 128 (e.g., a driver and a vibratory component, such as a motor), GPS or other location tracking module 130, other auxiliary I/O ports 134, and other subsystems 136. Other I/O subsystems can include pointing devices or touch devices such as trackballs, IR fingerprint detectors, roller wheels, optical joysticks, and trackpads. The electronic device 100 may also be provided with an orientation or inertial navigation sensor 132 such as one or more accelerometers, used to detect the orientation of the device 100. Not all of these subsystems are required, and many may be omitted. For instance, where the primary user interface is a touchscreen, a physical keyboard may be omitted altogether. Some subsystems may be provided instead as peripheral devices that connect to the device 100 using a data port or transmitter.

FIG. 1 also illustrates software modules, including the OS 140 and programs 160 that may be present on the device. Not all of the modules illustrated need be provided on the device, and other software components may certainly be provided on the device instead. Programs 160 may be installed on the device 100 during its manufacture or together with the loading of the OS 140, or at a subsequent time once the device 100 is delivered to the user. The OS 140 and programs 160 may be loaded onto the device 100 through at least one of the communication subsystems 116*a-n*, an I/O port, or any other suitable subsystem.

Specific examples of applications that may be resident on the electronic device 100 include an email messaging application 161, as well as other types of messaging applications for instant messaging (IM) 162, Short Message Service (SMS) 163, and social networking or messaging applications 164. Other applications for messaging can be included as well, and multiple applications for each type of message format may be loaded onto the device 100. There may be, for example, multiple email messaging applications 161, and multiple IM applications 162, each associated with a different user account or messaging service. Alternatively, other means may be implemented on the device 100 to provide access to multiple messaging accounts or message types; for example, a unified inbox application 167 may be provided on the device as an application or as part of the OS. The unified inbox application is configured to list messages received at and/or sent from the device 100, regardless of message format or messaging account.

Other applications include a calendar application 165, task application 166, map or navigation application 168, utilities 169, media player 170 including audio 171, photo 172, and video 173 components for playback, recording, and/or editing of media files, contacts or address book application 174, browser 176, file manager 177. Other applications 178 may be included. Again, not all of these applications need be provided on the device 100. One or more virtual machines 175 may also be resident on the device 100, possibly integrated with the OS 140, to provide discrete runtime environments for executing code on the device 100.

The memory of the device 100 also houses the application data 180, which can include configuration information, and data stores for user data. Permission to access the data store for a given application may be limited to the associated application, although permissions may be configured differently so that other applications or functions executing on the device have access to data objects stored in the data stores, or at least have access to metadata for these objections.

While the example electronic device 100 is a wireless communication device and may be referred to herein as a "handheld" or "mobile" device, it will be appreciated by those skilled in the art that this description is not intended to limit the scope of the described embodiments to implementation on devices with a specific form factor or devices that are intended primarily or solely for communication or productivity. The examples herein may be applied to any appropriate data processing device adapted to communicate over a fixed or wireless connection, whether or not the device is portable or wirelessly enabled, whether or not provided with voice communication capabilities, and regardless of its primary intended usage, such as productivity or entertainment. Suitable devices may therefore include, without limitation, cellular phones, smartphones, wireless organizers, personal digital assistants, desktop computers, notebook computers, laptops, tablets, terminals, gaming devices, and the like. Unless expressly stated, an electronic device 100 may include any such device. The configuration and operation of all such devices is generally known to those skilled in the art.

The electronic device 100 may be provisioned with single or multiple messaging accounts employing one or more different messaging formats or types, which can include email, Short Message Service (SMS), Instant Messaging (IM), Multimedia Messaging Service (MMS), Visual Voicemail (VVM), PIN-based messages (messages addressed using an alternate identifier, such as a proprietary address or hardware identifier), social network messages or notifications, and calendar and task events (if not transmitted as attachments to other messages).

The formatting and transmission of all such messages, storage and indexing of such messages, and the implantation of suitable messaging infrastructures to support all of these example communications will also be known to those in the art. For example, email messages and services may be constructed and implemented in accordance with known Internet messaging standards including Internet Message Format RFC 5322 and RFC 2822, published by the Internet Engineering Task Force, as well as their predecessor, successor, and companion standards. IM messages include network-based and peer-to-peer messages, and such messages and services may be defined in accordance with known standards such as RFC 2779 and RFC 3921 also published by the Internet Engineering Task Force, and their companion, predecessor and successor standards. Point-to-point SMS messages may be implemented in accordance with 3GPP (3$^{rd}$ Generation Partnership Product) Technical Specification 03.40, and optionally extended for transmission of MMS messages as specified by the Open Mobile Alliance Multimedia Messaging Service V1.3, and their companion, predecessor and successor standards. Regardless, all such messages and services intended for use with the within embodiments may also be defined in accordance with proprietary standards and protocols. Messages may be defined, formatted, and presented using messaging applications implemented on user devices such as the electronic device 100 described above. Messages are typically identifiable by a unique or quasi-unique handle or identifier (ID), implemented within the message format in a suitable location, for example in a header of the message. Some message formats may not include a header distinct from the body in the manner of an email format, but may nevertheless comprise content in a payload portion in addition to metadata. Some message types permit messages to be interrelated, for example by cross-referencing identifiers, thread identifiers, subject line, or the like, as discussed below. Whether interrelated or not, messages exchanged between a given set of participants (senders and recipients, or originating and recipient or destination devices) may be presented by messaging applications in a conversational paradigm, chronological order, or reverse chronological order, or in any other suitable presentation form or order.

In addition, the electronic device 100 may also be configured to generate notifications to the user (e.g., by visual or audible means) about various status changes or events detected by the device OS 140 or a particular application 160 executing on the device, such as a notification of a telephone call event (e.g., an incoming call, whether accepted or missed/ignored, or an outgoing call); an application or OS update available for download; device status notifications such as location-based alerts; notifications triggered by a specific device status such as low battery level, low storage capacity, and so forth. These notifications are optionally configurable by the user. The format of the notification may be proprietary to the platform on which the application operates, or proprietary to the application or the OS itself, but it is expected that a notification will likely include an identifier such as a handle for the application or function that spawns the notification, and a content or payload portion comprising the information to be conveyed to the user, and optionally ancillary metadata.

Messages and notifications may be considered to be "communication events", as they are intended for presentation to the user of the electronic device 100, whether or not the originator of the communication event is another user, a network operator, or the electronic device 100 itself, whether or not the communication event is received by the electronic device 100 over a network, and regardless of format or protocol employed. As used herein, "communication event" is not necessarily restricted to the fact of an occurrence, but may also be used interchangeably with "communication event data", "item" or "object", to reflect the data received or otherwise obtained by the electronic device comprising content and/or metadata pertaining to the event.

As mentioned above, unified user access to a plurality of message types and/or accounts may be provided on the electronic device 100 by means of a unified inbox which collects information about messages associated with different types and/or user accounts, and presents the information in a global message or content list for viewing or interaction by the user. The unified inbox, however, need not be restricted to messages; it may include all types of communication events, including notifications. The unified inbox listing may therefore be considered to be a unified listing of "events" rather than merely messages, and unless expressly or implicitly stated otherwise, references herein to a "unified inbox", "unified event list(ing)", or "unified communication event list(ing)", or to a set of communication event listings, are intended to be inclusive of messages, notifications, and analogous data objects such as draft messages. The description below also refers to a "unified event manager", which is configured to generate and present such a unified inbox and may be the application 167 or that set of processes within the device OS 140 that permits single-view access to communication events associated with a plurality of applications, message formats or types, and/or accounts in the manner described herein.

Figure 2:
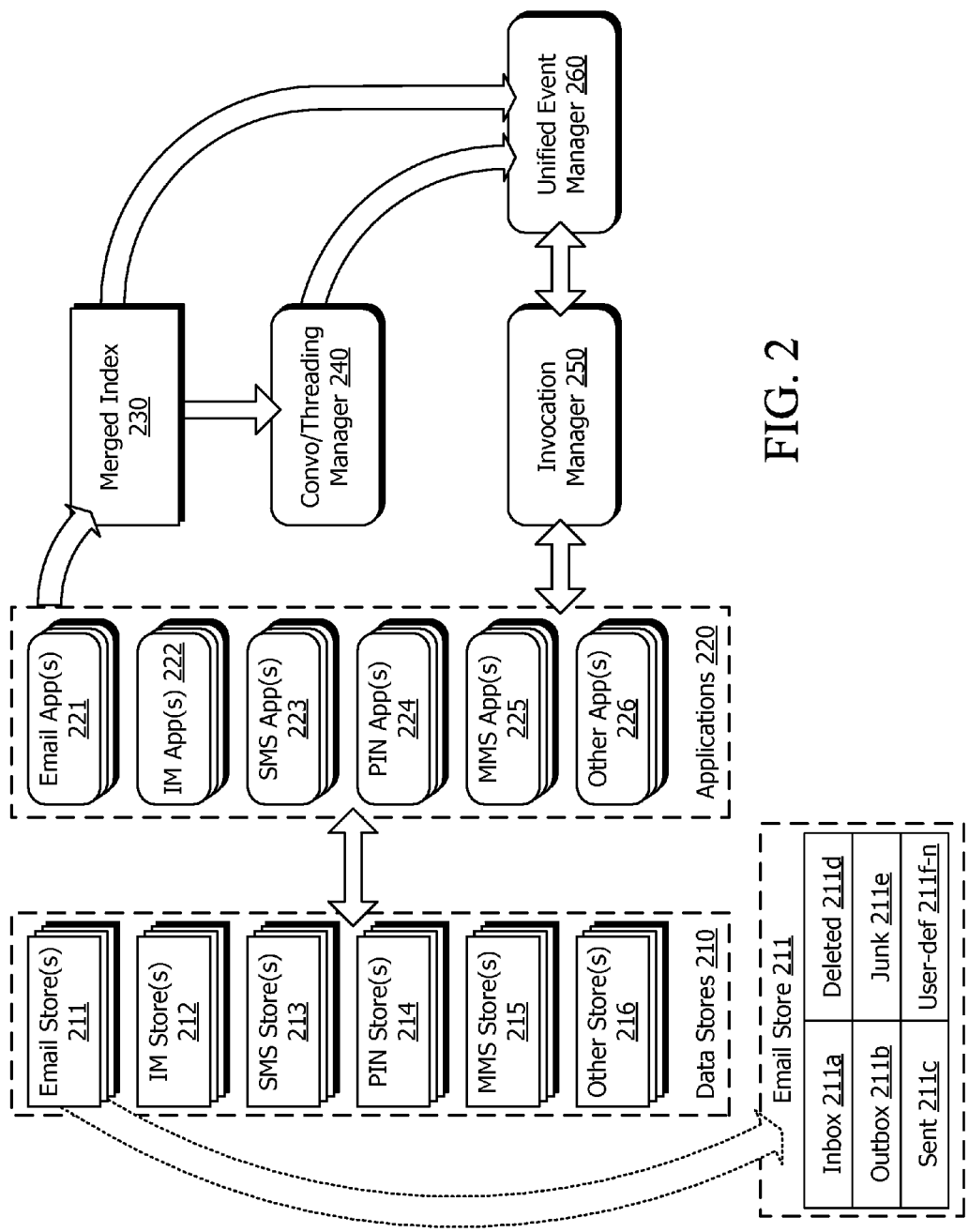
FIG. 2 is a block diagram illustrating possible components of the electronic device of FIG. 1 and interaction between the components.

FIG. 2 is a block diagram illustrating select components on the electronic device 100 pertaining to the management of communication event data. Data accessible to the electronic device 100 is provided in a number of data stores 210, which may be maintained in memory resident in the electronic device 100 itself, and typically in persistent memory. As can be seen in FIG. 2, the data stores 210 include stores for each type of message or notification serviced on the electronic device 100; thus, there may be one or more of an email store 211, IM store 212, SMS store 213, PIN store 214, MMS store 215, and other stores 216. The stores 210 may be associated with a dedicated messaging or notification application or function executing on the device, and/or with a particular message format. Since a device 100 may be provisioned with multiple user accounts for similar message formats, each provisioned account may be allocated its own distinct data store; therefore, there may be multiple email data stores 211, multiple IM stores 212, and so on.

The messaging data stores 210 maintained at the device 100 may represent only a portion of the complete message data associated with a given format or account. Complete data stores may be maintained at a remote location, such as s message server system available over a wireless network connection. Other communication events, such as notifications, may be stored in one of the distinct data stores on the device, although in some examples the notification may not be stored in a dedicated application data store; instead, the application may directly provide the notification data to the unified event manager 260, as discussed below.

Typically, each data store 210 is under the control of and is accessed by a corresponding or dedicated application 220. FIG. 2 illustrates that there is an application 220 corresponding to each of the data stores 210; thus, there are one or more email applications 221, IM applications 222; SMS applications 223, PIN applications 224, MMS applications 225, and other applications 226. When a new object or transmission comprising communication event is obtained by the electronic device 100 or a change to an existing communication event is detected, the appropriate application 220 is notified, if the application 220 itself was not the source of the new or changed communication event. The application 220 can then store the new or changed communication event in its corresponding data store 210.

Communication events within a given data store may be arranged or categorized in virtual "folders" or "files", or otherwise given category tags or similar attributes for assisting the user in organizing messages. Possible folders or categories for the email store 211 are illustrated in FIG. 2. In this example, the email store 211 includes virtual folders for a default inbox folder 211*a*, to which new incoming messages are automatically allocated in the absence of any rule assigning the message to another folder; an outbox 211*b*, to which messages to be transmitted from the electronic device 100 are allocated; a sent items folder 211*c*, to which those messages successfully sent from the device 100 are allocated; a deleted items folder 211*d*; a junk message folder 211*e*; and any user-defined folders 211*f-n*. When a message is processed by the associated messaging application, the application may set a flag or an attribute for the message designating a folder, (which may be in the message's header, or else otherwise associated with the message) and store this flag or attribute in association with the message in the data store 210. The application used to access the data store can use the flags or attributes to sort or organize the messages for presentation to the user. Other types of communication events besides email may be capable of being organized or categorized in this manner as well.

A new communication event may be "obtained" in that it is generated by the application executing on the device 100, which may be the case where a message is being composed on the electronic device 100 and stored in the appropriate data store 210. It may also be obtained through receipt over a fixed or wireless connection, as in the example of a message addressed to the user of the electronic device 100 and received by the device, or in the example of a communication event that is received by the device 100 through synchronization of a data store 210 with a server or other data source over a fixed or wireless connection.

A change to a communication event that was previously stored in a data store 210 may result from the user editing or altering the communication event (as in the case of previously-stored draft message that is subsequently accessed and edited by the user); from synchronization when a newer version of a communication event is merged with, or overwrites, a corresponding communication event already stored in a data store 210; or from a change to the communication event's status or attributes (e.g., metadata). For example, when a communication event such as a message is received at the electronic device 100, it may be automatically assigned a status or flag indicating that it is "new", or "unread", or "unopened"; but once the communication event has been accessed by the user (e.g. viewed on the display 114), the status of the message may be altered to remove the "new" designation", and/or to change the "unread" or "unopened" status to "read" or "opened". An application 220 may be configured to automatically make such a change to the message status once the message is read, but status values and attributes of a communication event may also be altered expressly by the user, rather than automatically. For example, the user may choose to mark a "read" message as "unread" again, or to delete the message from the data store. There are a number of different status identifiers or attributes that are conventionally assigned to messages, such as "read", "new", "draft", "recent", transmitting" or "pending", "deleted", "filed", and so forth. The meanings of such attributes or status identifiers, and their application, will be understood by those skilled in the art, and furthermore those skilled in the art will understand that these attributes and other terminology pertaining to status or attributes herein are not intended to be limited to a single literal meaning, and some terminology will be understood by those skilled in the art to be synonymous with other terminology.

The various data stores 210 thus comprise a set of communication event data sources that can be directly accessed by their respective custodian application 220, and processed in diverse ways for customized presentation by the application 220. In addition, the electronic device 100 of FIG. 2 includes a unified event manager 260 that provides for the unified presentation of diverse communication events, as mentioned above. In response to a new or changed communication event, an application 220 notifies other components, such as the unified event manager 260, or another process such as a home screen application (not shown in FIG. 2) executing on the electronic device 100. This notification is to be distinguished from the user-directed application and device event notifications described above. The notification to other components may comprise data passing directly from the custodian application 220 to the other components each time a change is made to the data store 210. Alternatively, each application 220 may grant access to other components on the device 100 to monitor notifications issued by the application. Each component having an "interest" in changes made to a given data store 210 may register as a listener for new notifications by the application 220. Notifications may include a communication event identifier (ID) or handle, a value unique to at least the application 220 to uniquely identify the communication event in the data store 210; an application ID to identify the custodian application; and optionally information about the status change (e.g. "new") or other metadata, or even select content of the communication event. If listening components receive only the identifiers in a notification but still require metadata or message content, the listening components may be granted direct access to the application data store 210 to retrieve the required information.

In this particular illustrated example, for convenience a merged index 230 of communication events is defined and stored on the device. This merged index 230 can comprise a master index of communication events, which obtains information about changes to the data stores 210 from various applications 220. The merged index 230 provides information about indexed communication events to a conversation or threading manager 240, if available on the electronic device 100, and/or to the unified event manager 260. The unified event manager 260 may use the merged index data 230 to construct unified inbox views for display. The conversation manager 240, if present, generates a threaded index of communication events based on the information in the merged index 230, and determines membership of a given communication event in a thread based on select attributes of the communication event. Information about threads may be provided to the unified event manager 260 in the event that communication events are to be presented in the unified event view collated by conversation or thread. Different methods of defining a message thread or conversation, and determining whether a given message belongs to a particular thread or conversation, are known to those skilled in the art.

The merged index 230 and/or conversation manager 240 may be comprised within the unified event manager 260, or may be independently running processes that serve other applications on the device 100. Accordingly, the description below refers generally only to the unified event manager 260 for ease of reference. Examples of unified inbox operation, conversation manager operation, the use of merged indexes, and other functions that operate in conjunction with a unified inbox are described in U.S. Pat. No. 7,568,011 issued Jul. 28, 2009; U.S. Pat. No. 8,375,400 issued Feb. 12, 2013; and U.S. Patent Application Publication No. 2013/0297604 published Nov. 7, 2013, all of which are incorporated herein by reference.

During execution, the unified event manager 260 or another application 220 may require services from or user interaction with another application executing on the device. For instance, when a user wishes to view a given message in a unified inbox view displayed by the unified event manager 260, the actual display of the message may be managed by the custodian application 220 that owns the data store in which the message is stored, or that is associated with the message type of interest. Thus, in response to a user command to display the message content, the unified event manager 260 may send a request to the messaging application to launch a particular view displaying the message content. The requests may be sent directly from one application or process to another; however, it is often convenient for such requests to be brokered by an invocation manager 250, which receives invocation requests from requesting applications or processes, and sends the requests for service to the designated target. In this way, both requesting and responding applications need only address the invocation manager 250 rather than track the addresses or handles for potentially dozens or hundreds of different applications and processes available on the device. FIG. 2 thus includes an invocation manager 250, in communication with the unified event manager 260 and other applications 220.

Turning now to FIG. 3, an example of a first unified communication event view 300 containing a listing of a number of communication events as may be generated by the unified event manager 260 is shown. It may be noted that the display screens of devices illustrated herein generally include a status bar or banner 310, which conventionally includes device status information of particular relevance to the user, such as the current date/time, battery level, signal level, and network identifier. The status bar 310 can omit some of this information and include other information. The status bar 310 is typically a fixture on all or most application views on a typical device, and is not necessarily generated or managed by an executing application on the device, but rather by the OS 140; accordingly, it may be considered to be excluded from the unified communication event views discussed below.

In the first view 300, it can be seen that there is a set of communication event listings 330 arranged in a list format. The examples described herein are described and illustrated primarily in relation to email, Short Message Service (SMS), and Instant Messaging (IM) messages. However, in view of the discussion above, it will be appreciated by those skilled in the art that these examples can be extended to other types and formats of communication events, including without limitation those other types and formats mentioned above. It can be seen from FIG. 3 that each communication event listing within the list contains some information about the communication event, such as a sender name, subject line (if applicable), preview (excerpt) of the message (if applicable), a date and/or time of receipt, and any other indicators or flags to indicate particular attributes of the message, such as whether the message has been flagged or contains an attachment.

The first view 300 also includes an optional overlay 350, which includes icons or user interface elements for invoking frequently accessed commands, such as "compose a new message" 353, "view attachments" 352, and "search" 354. Other user interface elements 351, 355 may be included to permit the user to access other communication event information or additional functions. This overlay 350 is omitted from the remaining drawings for clarity.

In the first view 300, each listed communication event is represented by a principal user interface element 340 (indicated by a dashed line) that, when actuated, permits the user to access an operation on the communication event, or further information about the communication event. For example, to view the message content of the communication event represented by the principal user interface element 340, on a touchscreen-based device 100 the user may touch the surface of the screen coinciding with the principal user interface element 340 to invoke a view message operation for the communication event; or, in response to a "long press" (a touch having a duration extending beyond a predefined threshold time), a context menu containing further user interface elements for invoking further commands may be displayed. Thus, "actuation" of a user interface element can include conventional user input operating on the user interface element so as to provide a signal or instruction to the executing application or OS that a particular action represented by the user interface element is to be carried out. A user interface element is "actuatable" if a command, action, or operation associated with the user interface element can be invoked as a result of a user input selecting or otherwise acting on the user interface element. Different forms of actuation (by a touch or gesture, or by a pointing device, voice command, and the like) will be known to those skilled in the art.

The principal user interface element 340 can include graphic and textual elements as in the example of FIG. 3. Here, the principal user interface element 340 includes an icon 342 that indicates a particular status or attribute of the communication event, as well as the communication event's type, and summary content and/or metadata 344 such as the sender, subject line, and datestamp. Not all of the information depicted in FIG. 3 need be included in the principal user interface element 340, and the user interface element 340 may include other information.

The unified communication event listing view 300 of FIG. 3 is representative of common event listing views currently employed on mobile devices, and illustrates some of the difficulties in implementing a robust user interface for management of multiple data items on a small display screen. The event listing view generally employed on handheld mobile devices is based on the usual type of message listing view used with desktop and laptop computers, which have larger screens; but on a smaller screen, there is limited space available for icons and other graphical user interface elements that can be associated with actions or operations to be performed on individual communication events, such as "reply" or "forward" actions. Adding these icons comes at a cost of display space available for other useful information about the listed communication events. Instead, mobile device messaging applications and inbox applications rely on nested or multiple-stage commands: to reply to a message, the user must first view the message, and then locate a "reply" button on the message view screen; or else, the user must invoke a context menu specific to the selected message in order to view a menu of options for replying to or forwarding the message.

Increased reliance on messaging of all forms, and the continued creation of new messaging services and social network platforms, result in even more messages and notifiable events arriving at a user's mobile device. The unified communication event listing provides a convenient way for the user to review multiple types of messages at a glance instead of serially launching and operating multiple messaging applications. Again, though, the smaller screen size of mobile devices restricts the number of messages and notifications viewable in a single glance. A heavy user of messaging services will likely find it necessary to scroll past screenfulls of newly received messages in order to find messages that were received even only a few days ago.

Bulk management is sometimes a useful way to deal with the onslaught of incoming communication events. For example, a user could review a set of messages, determine that they do not need to be retained in the message data store, and delete the entire set by selecting a plurality of messages, then invoking a "delete" command. Or, the user might choose to file all of the messages, thereby removing them from the unified view, if the device 100 is configured to exclude filed messages from the unified view. In a typical touchscreen device scenario, bulk processing of n messages therefore requires n+2 touches: one to enter a multiple-select mode; one for each message selected; and one for the invoking the delete command. If the touchscreen device supports multi-touch, the bulk processing may require only a multi-touch gesture to select a plurality of messages plus one gesture for the delete command. Bulk management, however, requires that all selected messages be processed the same way. If the user wishes to delete one message and file the next, then a minimum of two touches for each message is generally required in a touchscreen environment: one to select the message of interest, and one (or more) to select the desired action. Thus, individual processing of n messages may require at least 2n touches, which requires more processing resources to handle, and involves more wear on the touchscreen than the bulk management option.

Accordingly, in these example embodiments, the unified event manager 260 on the electronic device 100 is configured to selectively operate the unified communication event listing view in two modes. The first mode is reflected in the view 300 of FIG. 3. The second mode is illustrated as view 400 in FIG. 4. The unified communication event listing view may be toggled between the two modes by actuation of a user interface element 420, located in any appropriate position on the display screen, or alternatively by a predefined gesture command, keypress combination, voice command, or other user input.

In the second mode, a region of the view 400 now displays an array of further user interface elements 450, with one or more additional action user interface elements 450 corresponding to each communication event listing in the unified view. Each of these user interface elements in the array 450 is associated with, and may be actuated to invoke, an action that operates on its corresponding communication event. The specific actions that are associated with the corresponding communication event depend on either the communication event type, the device user's account associated with the communication event, or both. For instance, in FIG. 4 it can be seen that while the majority of communication event listings now include a "delete" action user interface element, as exemplified by a trashcan icon 448, not every listing includes this user interface element. Table 1 illustrates a possible assignment of actions to communication events of different types, where a maximum of two actions is assigned:

TABLE 1

Example assignment of actions according to communication event type.

| Type | Action 1 | Action 2 |
| --- | --- | --- |
| Email message thread | Flag | Delete |
| Single email | Flag | Delete |
| Draft message (any type) | File (or Edit, or None) | Delete |
| Meeting invitation | Accept | Decline |
| Device event (e.g. device status) | None | Delete |
| SMS message | Reply | Delete (end chat) |
| IM message | Reply | Delete (end chat) |
| PIN message | None | Delete |
| Social message | Share (or None) | Delete |
| Phone event (e.g. missed call) | Send reply SMS (or None) | Delete |
| Other (default) | None | Delete |

Thus, in the example of Table 1, those types of communication events that have formats supporting the setting of a "flag" attribute (e.g., a follow-up flag, as opposed to a priority attribute set by the original sender of the message) may be associated with a user interface element for an action to invoke a flag action. Most communication event types are associated with a "delete" action, but in the case of a meeting invitation, the actions provided in the array 450 are "accept" and "decline". Some communication event types are associated with a form of reply (or "sharing", in the case of certain types of social networking messages) that can be composed while remaining in the context of the unified communication event view; these reply operations are discussed below, as are meeting invitations. The assignments in Table 1 are merely examples; variations are certainly possible and within the scope of the person of skill in the art. For instance, one of the actions may be configured as an operation to send the corresponding communication event to a "junk" folder in the event the user determines that it is unsolicited mail.

The assignment of actions to particular communication event types or accounts may be carried out at the time the custodian application 220 associated with a given communication event data store 210 is installed and registered with the unified event manager 260. In the absence of any definition of actions to be associated to a particular communication event type, a default set of actions consisting of a "delete" user interface element may be assigned. The assignment of actions will be discussed in further detail below.

When one of the action user interface elements included in the array 450 is actuated, its corresponding operation is carried out on the corresponding communication event. The operation may follow immediately upon actuation, but in some instances, the user may be given an opportunity to undo or prevent the operation from being carried out. This may be done in the case of deleting a communication event, or moving it to another location or folder, which on a mobile device may be an act of relative permanence with respect to the unified communication event view, since deleted items may not be retrievable on the mobile device or via the unified view. In that case, the operation is not actually committed until a triggering event is detected. As will be seen in the following discussion, the action user interface elements included in the array 450 may also change depending on the state of the communication event in the unified communication event view 400.

As can be seen in FIG. 4, the number of "active" regions (i.e., actuatable user interface elements) for each communication event listing has increased from the single actuatable user interface element 340 in FIG. 3. In the example of FIG. 4, there are now up to four actuatable user interface elements: the first user interface element 442 comprises an icon, and may be used to toggle a "read"/"unread" attribute of a communication event, where applicable (not all communication event types support this type of attribute); principal user interface element 444, which in this example includes communication event content and/or metadata as in the summary content/metadata 344 of FIG. 3, is actuatable to invoke a viewing operation (i.e., to view the communication event details in a new view that replaces the unified communication event listing onscreen); third user interface element 446 comprises an icon and is associated with the first additional action; and fourth user interface element 448 comprises an icon and is associated with the second additional action. The user interface elements need not contain the specific illustrated icons shown in FIG. 4, or make use of icons at all. While the summary content and/or metadata that were visible in FIG. 3 are now truncated in the illustration of FIG. 4, it should be recalled that this truncation is only temporary, because the unified event communication listing view 400 is being displayed in the second mode.

This second mode permits the user to invoke a plurality of actions in respect of a plurality of communication events, even if the actions are different, while reducing the amount of time the user must spend navigating the unified communication event view 400, and also possibly reducing the number of user input events (e.g., touches), or the duration of user input events, required to effect all of these actions.

Figure 5B:
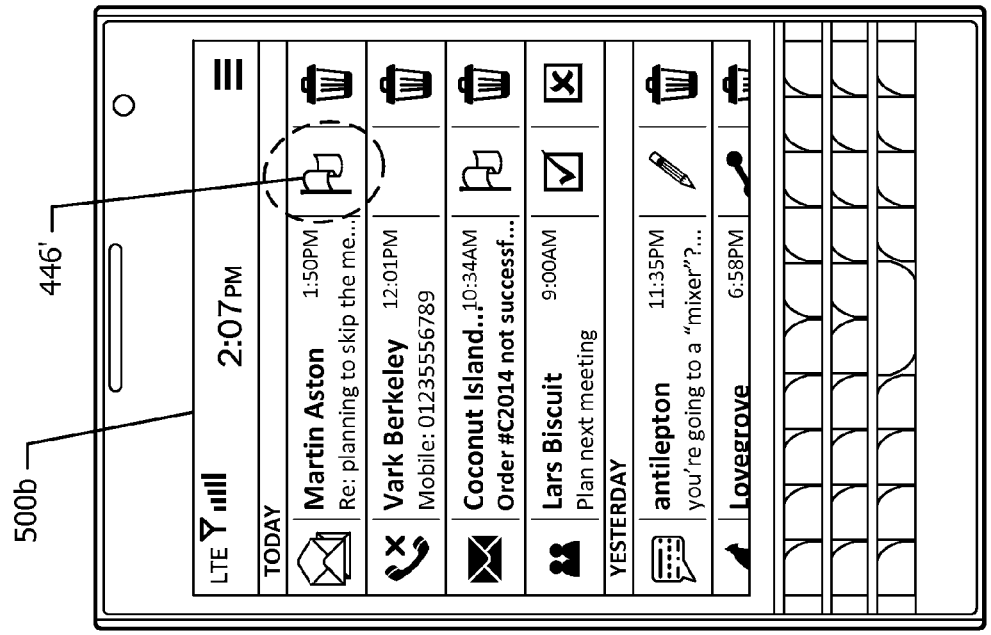
FIGS. 5A and 5B are further illustrations of the unified event listing view in the second mode executing a toggle action.
Figure 5A:
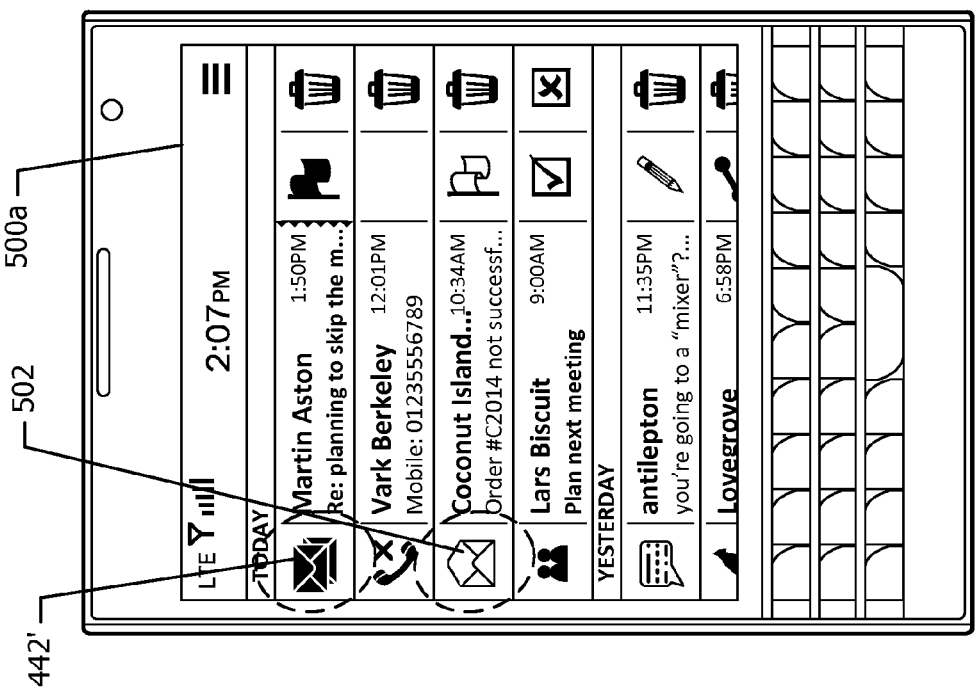

FIGS. 5A and 5B illustrate how some action user interface elements respond to actuation to permit the user toggle their effects. The view 500a in FIG. 5A illustrates the effect of a touch or other actuation on an icon. In FIG. 5A, actuation of the user interface element 442' (demarcated by an ellipse representing a possible area of a touch, if a touch input is employed) results in the message thread represented by this communication event listing being marked as "unread", as it was previously marked read (as signified by the state of the icon in 442 in FIG. 4). Actuation of user interface element

502, previously signifying an "unread" state, marks the communication event associated with the user interface element 502 as "read". Actuation of these communication event icons thus toggles the communication event between a "read" and "unread" state, and optionally toggles the visual appearance icon between different states in order to signify to the user that a change in an attribute was made. When the state or attribute associated with the communication event is changed, the changed value is stored in association with the communication event in its corresponding data store 210.

The availability of a "read"/"unread" action by actuation of this particular user interface element depends on whether the communication event type supports a "read"/"unread" state. For instance, the application or OS function that issues device status notifications (e.g., a warning about low storage capacity remaining) may not store the notifications in a manner that permits them to be marked as read or unread. In that case, this toggling user interface element may not be provided for this type of communication event; instead, this region or icon in the communication event listing may be combined with the main actuatable user interface element for the communication event. Referring back to FIG. 4, where no read/unread toggle action is available for a communication event, the user interface element 442 may be incorporated into the main user interface element 444. In the illustrated examples, the unified view may include visual indicators demarcating the various user interface elements so as to indicate to the user that each user interface element represents a distinct action. For example, it can be seen that the different user interface elements in communication event listing 440 are visually separated not only by space, but also by a vertical line segment.

View 500*b* of FIG. 5B illustrates a further toggle effect on one of the actions specified for the email message thread event type. In FIG. 4, the icon of user interface element 446 was in a first state, indicating that the message had been "flagged" (e.g., for follow-up). In FIG. 5B, as the result of a touch or other form of actuation, the icon in user interface element 446' has been "cleared", or removed.

FIGS. 6A to 6D illustrate the operation of the unified communication event view 600*a*-600*d* in response to a "delete" action. A "delete" action, in this implementation, is not actually committed until a trigger event is detected, to provide the user with an opportunity to abort the deletion. FIG. 6A resembles FIG. 4; in this unified event communication view 600*a*, the user interface elements 612, 614, 616, and 618 which appear in relation to communication event listing 610 are indicated. These user interface elements correspond to the example elements 442, 444, 446, and 448 described in relation to FIG. 4. User interface element 612 is an icon that can be actuated toggle a status of the single message represented in this listing 610 between "read" and "unread"; user interface element 614 contains message content and/or metadata, and is actuatable to initiate a view operation on the communication event; user interface elements 616 and 618 are the two additional actions selected to be represented when the unified event communication view executes in the second mode, which in this case are "flag" and "delete".

In response to the actuation of the "delete" user interface element 618 (the element is again demarcated by an ellipse representing a possible touch area if a touch input is employed), the communication event listing 610 is updated in view 600*b* to listing 620. Instead of immediately removing the listing 610 from the communication event list view 600*b* or interrupting the user's operation of the device 100 by prompting for the user to confirm deletion of the listing 610, as is typical in response to a delete command, the listing 620 is preserved in the view 600*b* with a form of placeholder.

In this example, both the content and actuatable user interface elements of the communication event listing 620 are altered to provide a visual cue to the user that an instruction had been received to alter the status of the communication event represented by the listing 620, and to provide further action options. Originally presented action user interface elements 612, 614 have been replaced by a single placeholder element 622, which in this example bears the notation "Message removed". Action user interface element 616 has been removed from the view 600*b*. The user interface element 624 in FIG. 6B is a blank area; within the actual document structure of the view 600*b* this may still be a discrete display element, even though it is not actuatable. Action user interface element 618, which represented the "delete" action, has been replaced with an "undo" action user interface element 626 to permit the user to reverse the "delete" instruction. Just like the originally presented action user interface elements 616, 618, the "undo" action user interface element 626 is maintained inline with the communication event listing so that it does not obscure other displayed content.

Thus, the altered communication event listing 620 is maintained in the view 600*b*, providing the user with an opportunity to reverse the deletion instruction, until a trigger committing the delete action is detected. The trigger may be actuation of a user interface element corresponding to a different communication event, or an instruction to the unified event manager 260 to exit the second mode and return to the first mode. Examples of triggering actions are illustrated in the view 600*c* of FIG. 6C: actuation of a toggle user interface element 640 or 446 to change a state or attribute of another communication event; actuation of a principal user interface element 645 of another communication event in order to invoke a view operation; or actuation of the mode toggling user interface element 420 (or other input command). However, a scroll or pan command to cycle displayed content onscreen to enable the user to view communication event listings that are part of the unified communication event view but are currently in an overflow region not currently displayed on the screen, does not constitute a trigger in this implementation.

Turning to FIG. 6D, once the "delete" action is committed in response to the detected trigger, the communication event listing 620 is removed altogether from the view 600*d*, and the communication event is deleted from its corresponding data store 210. In a manner known in the art in the implementation of inbox views, the subsequent communication event listing 630 is then moved up into the position of the removed communication event listing 620. Alternatively, if the "undo" user interface element 626 is actuated, the "deleted" status applied to the communication event is removed, and the communication event listing 620 is restored to its original state 610, as shown in FIG. 6A. No change would be made to the communication event as stored in its respective data store 210, since the communication event is not to be deleted.

A "file" action, which causes the communication event to be filed in a particular virtual folder, or have a category or user-defined attribute assigned to it for organizational purposes, may be implemented in the second mode view 400 in a similar manner as the "delete" action. For example, the first time a "file" user interface element is invoked, the user may be prompted to input a destination folder, category, etc. for the communication event. Once input, the communication event listing is updated to remove the "file" action user interface element, and replace it with an "undo" user interface element, a "move" user interface element, or both. The principal user interface element for the communication event may be altered to indicate to the user that an instruction to "file" the event had been received. If "undo" is selected, the communication event listing is restored to its previous appearance, and the communication event is not filed. If "move" is selected, then the user is prompted to input a different destination for filing the communication event. When a trigger event is detected, the change to the storage location or folder for the communication event is committed, for example by updating the corresponding data store 210 to add a value assigning the destination as a label or category. Once "filed", the communication event listing may be removed from the view 400 altogether, as in the case of a deletion. The "file" action is illustrated in connection with FIGS. 17D and 17E, discussed below.

The foregoing examples of setting a flag and changing the communication event status between read and unread may be considered to be toggling actions, since the user may toggle the flag and read/unread status of the communication event at will. While the option to "delete", "file", and "undo" the deletion or filing of a communication event effectively constitute a toggling option, as explained above in the implementation illustrated in FIGS. 6A to 6D, the availability of the "undo" option is time-limited since the "delete" or "file" operation is committed once a trigger is detected.

The unified communication event views in FIGS. 4 to 6D have been illustrated in a "conversation" or "threaded" view, in which communication events determined to belong to a common conversation, thread, or other grouping (whether based on sender identity, subject line, thread identifier, etc.) are represented by a single communication event listing, such as listing 340/440. It will be understood by those skilled in the art that the examples described herein can equally apply to views that do not use a conversation view, with suitable modification. For instance, referring back to FIGS. 4, 5A, and 5B, toggling of the actions represented by the action user interface elements 442, 442', 446, and 446' may apply to all communication events in the grouping represented by that communication event listing (or, in one variation, only to the last event in the grouping). Thus, every communication event in the grouping will be marked read/unread, filed, deleted, etc. together. If the communication event listing represents only a single communication event and not a grouping, then the toggled action is applied only to that communication event.

Figure 7A:
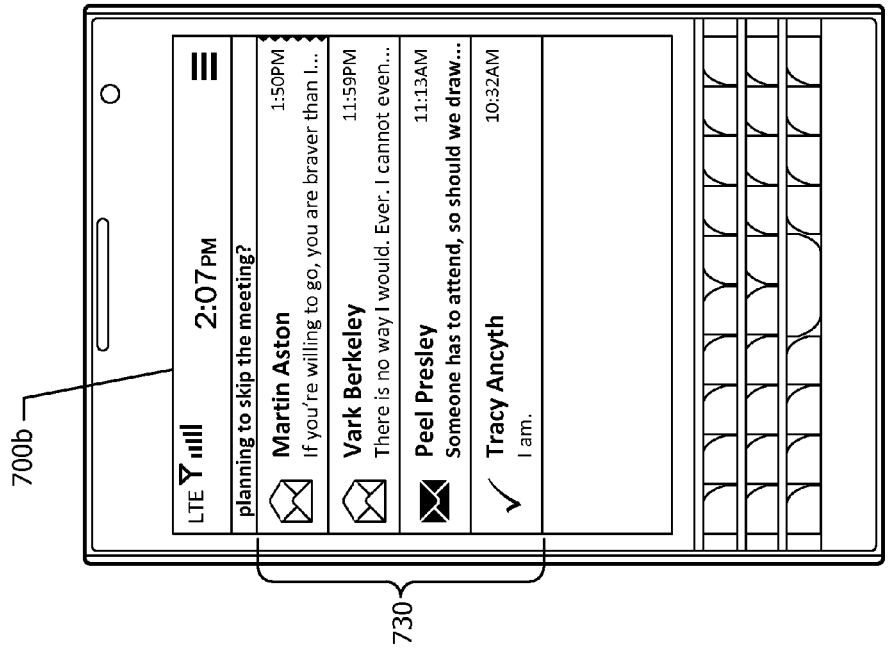
FIG. 7A is a further illustration of the unified event listing view in the second mode.

Particular to a "conversation" view, however, is the display of a further conversation view by the unified event manager 260 in response to a command to view a particular communication event listing. Turning to FIG. 7A, an initial unified communication event view 700a is shown, similar to view 400 of FIG. 4. When a main user interface element for a communication event listing representing a conversation or grouping of communication events is selected, such as user interface element 444, the unified event manager 260 retrieves further data pertaining to the conversation or grouping and presents a further view 700b listing the communication events belonging to that conversation or grouping, as shown in FIG. 700b.

Figure 7B:
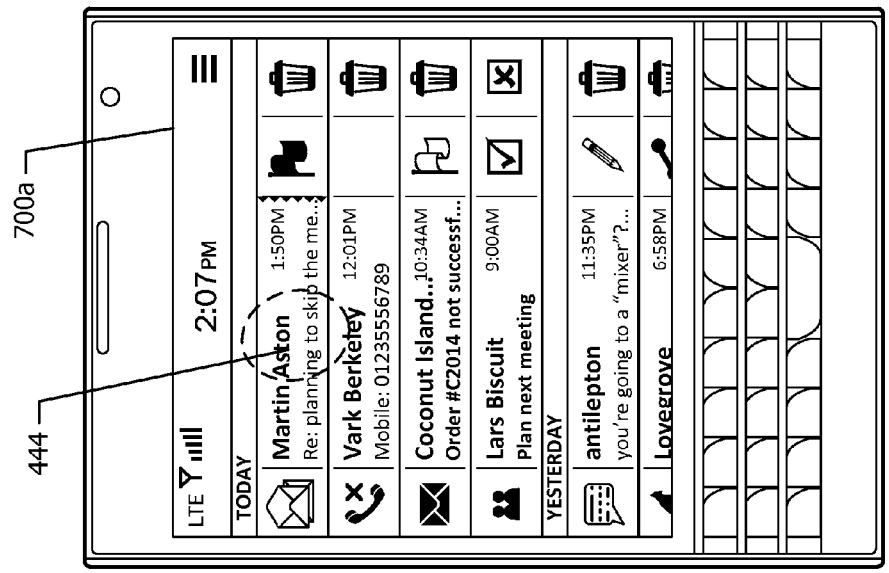
FIG. 7B is an illustration of an event listing view for a selected message thread in the first mode.

It may be noted that in the example of FIG. 7A, view 700a comprised the unified communication event view in the second mode. In response to the actuation of the user interface element 444 to view details of that particular communication event listing, the unified event manager 260 caused the view to exit the second mode, and return to the initial mode in FIG. 7B, so view 700b comprises a plurality of communication event listings 730 in a similar manner to the view 300 of FIG. 3. The second mode may again be invoked in response to the command to invoke that mode, for instance actuation of the user interface element 420, as shown in FIG. 7C. As a result, the unified event manager 260 alters the view to that of 700c, to include an array of additional action user interface elements 750 corresponding to each of the communication events displayed in the view 700c. In an alternative implementation, the second mode may be preserved when the view transitions to 700b, so it is not necessary for the user to re-invoke the second mode when the view 700c is displayed.

While each custodian application 220 corresponding to a given communication message type may define the available additional actions to be displayed in arrays 450 and 750, some configuration of the user interface elements included in the array may be carried out by the user. FIG. 8 illustrates an example view 800 for selecting actions for each of the first and second action user interface elements of the array from available sets 810 and 820, respectively. The eligible actions that are included in sets 810 and 820 may be defined by the custodian application 220 and/or the unified event manager 260.

Figures 9A, 9B:
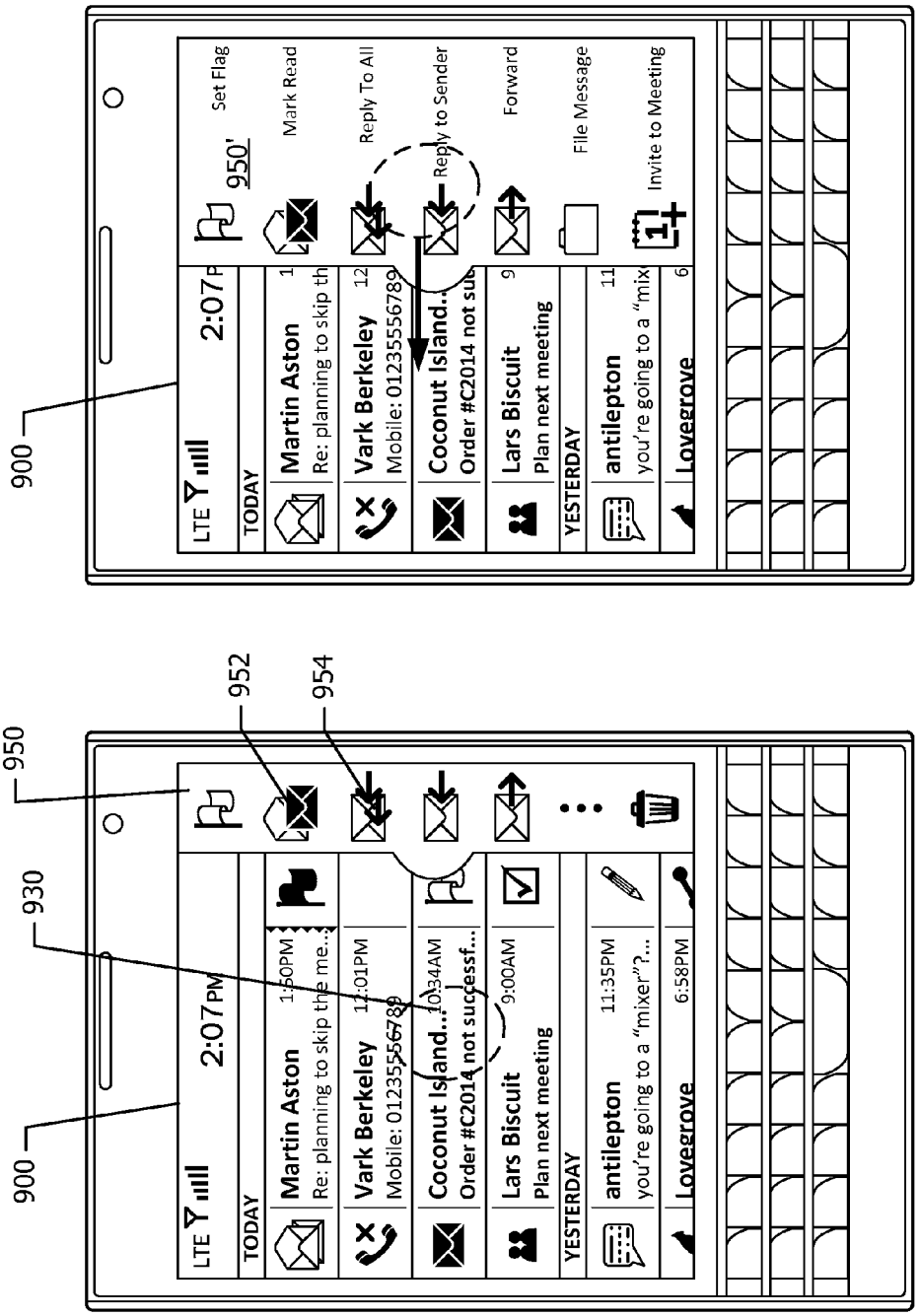
FIGS. 9A and 9B are illustrations of the unified event listing view in the second mode with an overlay contextual menu.

From the foregoing description, it will be appreciated that the invocation of the unified communication event listing view in the second mode (e.g. view 400) permits the user to initiate actions on a plurality of communication events within a single view, even when those communication events are of different types or associated with different user accounts, potentially using the same principal input action (e.g. a touch, in the case of a touchscreen, or a single click, in the case of a computing device receiving pointing device input). The second mode and array 450 or 750 are to be distinguished from a context menu, which is typically invoked by a secondary input action (e.g., a long press, in the case of a touchscreen, or a right-click, in the case of a computing device receiving pointing device input). This distinction is illustrated in FIGS. 9A and 9B, which depict the invocation of a context menu.

Context menus may be invoked for the inbox or unified communication event view as a whole; in relation to a specified user account; or in relation to a particular event type. The construction and use of context menus is generally understood by those skilled in the art. FIG. 9A shows a unified communication event view 900, in which an initial view of a context menu 950 has been invoked. The view 900 here is in the second mode, and is therefore similar to the view 400 shown in FIG. 4. The context menu 950 in this example is displayed in response to a context menu command, which here is invoked by a long press on a selected communication event listing 930. Since the context menu command was invoked in connection with a communication event listing, the context menu 950 is specific to the selected communication event type. Accordingly, the context menu includes user interface elements that can be actuated to invoke communication event-specific actions, such as marking the event read or unread 952, or replying to the event 954. Thus, the context menu can include user interface elements for actions that were also included in the second mode unified view 900.

The context menu 950 overlays the view 900; therefore, only the region of the context menu 950 is active and capable of receiving user input. Any user interface elements in the underlying view 900 are not actuatable while the context menu 950 is displayed. In some implementations, the context menu 950 may be extended to a wider view 950', as can be seen in FIG. 9B. This wider view 950' may include additional information regarding the displayed user interface elements, and optionally more user interface elements for invoking further actions. The context menu 950, 950' is thus a different logical and functional entity from the array 450, 750 or unified communication event view discussed above. Further, the context menu 950, 950', being invoked in the context of a single selected communication event, does not provide action user interface elements that can operate on any communication event besides the currently selected event.

Figure 10:
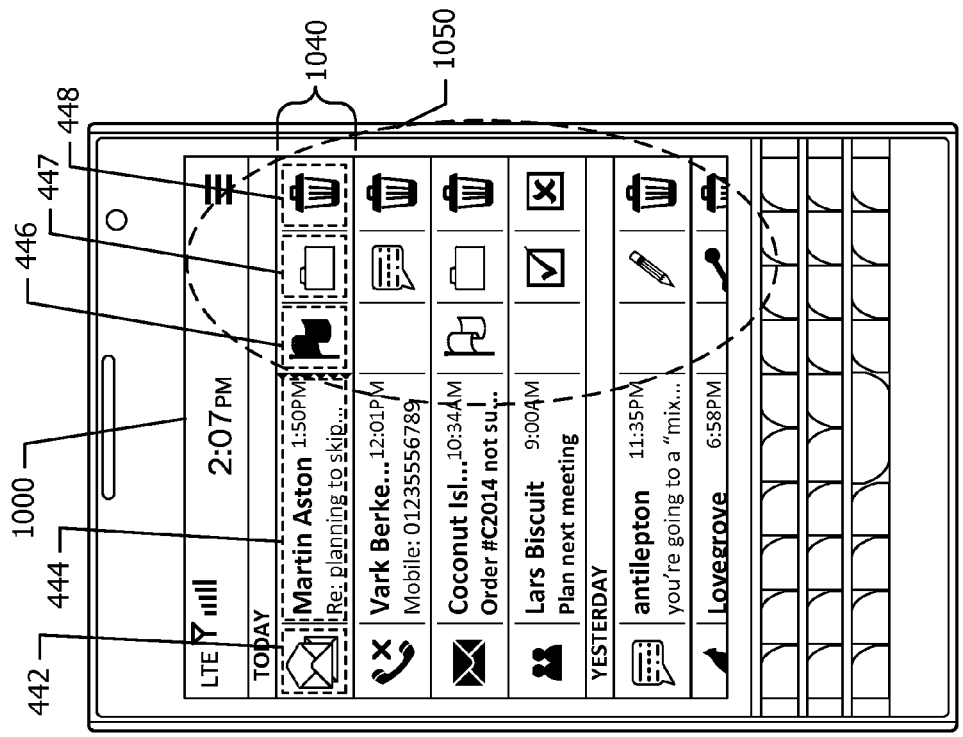
FIG. 10 is an illustration of still a further unified event listing view in the second mode.

The arrays 450 and 750 include sets of up to two action user interface elements for each communication event listing. In alternate embodiments, only one action user interface element, three action user interface elements, or more action user interface elements, may be included. FIG. 10 illustrates a further example of a unified communication event view 1000 in the second mode, including an array 1050 of up to three different action user interface elements to be displayed in association with each listed communication event. Thus, a single communication event listing 1040 can include up to five separate user interface elements for invoking different actions. In the example of FIG. 10, the first listing 1040, which represents an email conversation communication event, includes a first toggle user interface element 442 for toggling the status of the conversation (i.e., all messages within the conversation) as either read or unread, as described above; a second principal user interface element 444, as described above, for invoking a view operation for the communication event; and three further action user interface elements 446, 447, and 448. User interface elements 446 and 448 were described above; element 447 is a third element for still a further action, which here is a "file" action. Table 2 extends the possible action assignments set out in Table 1 to include a third action:

TABLE 2

Example assignment of three actions according to communication event type.

| Type | Action 1 | Action 2 | Action 3 |
|---|---|---|---|
| Email message thread | Flag | File | Delete |
| Single email | Flag | File | Delete |
| Draft message (any type) | None | File (or Edit, or None) | Delete |
| Meeting invitation | Tentative | Accept | Decline |
| Device event (e.g. device status) | None | None | Delete |
| SMS message | Reply (text) | Reply (call) | Delete (end chat) |
| IM message | None | Reply | Delete (end chat) |
| PIN message | None | None | Delete |
| Social message | None | Share (or None) | Delete |
| Phone event (e.g. missed call) | None (or add to Contacts) | Send reply SMS (or None) | Delete |
| Other (default) | None | None | Delete |

In some cases, the communication event can be associated with an action that invokes communication, as in the case of a reply (either by text message, e.g. SMS, or by a telephone call) or sharing a social networking message, and/or invokes a further application executing on the device, such as the "add to Contacts" action; actuation of such an action may invoke the launch of an address book application on the electronic device 100.

Of course, the various actions listed above in Tables 1 and 2 need not be presented in the order suggested in these tables. Moreover, actions suggested in a table for use in association with one type of communication event may also be associated with other communication event types even if not expressly declared in one of the above tables.

As noted above, in some instances the selection of a particular action user interface element in the array 450, 750, or 1050 results in a change to the displayed user interface elements to permit the user to select an "undo" or other action. Table 3 sets out some possible actions that may replace an initially displayed user interface element:

TABLE 3

Replacement actions.

| Originally Displayed Action | Replacement Action | Comment |
|---|---|---|
| Flag (set) | Flag (remove) | Toggle (reversal of action taken) |
| Flag (remove) | Flag (set) | Toggle |
| File | Undo/Move to different location | Either toggle or modify action taken |
| Accept/Decline (for meeting invitation) | File/Delete | Actions are completely replaced |

From the foregoing, it can be seen that configuring the unified event manager 260 in this manner to selectively display the unified communication event view in either the first mode or second mode improves efficiency in the processing and management of communication events via the primary user interface mechanism on a handheld mobile device, namely, the display screen or touchscreen. Returning briefly to the particular example of FIG. 4, it can be seen that it is theoretically possible for four different operations to be carried out on the first four communication events displayed in the view 400: clearing a flag, deleting the communication event, setting a flag, and accepting or declining a meeting invitation. All of these operations can be invoked within a single session of the unified communication event list view 400 in the second mode, without requiring invocation of a context menu. Further, the sets of operations can be different for communication events of different types or associated with different user accounts. In a touchscreen implementation, these operations can be accomplished by as few as five or six touches (i.e., n+1 or n+2 touches): one touch to invoke the second mode; one touch for each action user interface element of the array 450 to be actuated; and depending on the order in which the action user interface elements are actuated, one final triggering touch to commit the last action invoked in the second mode. For example, if the final action taken is to set or clear a flag, there is no need for a further triggering event to commit the final action; but if the final action is deletion, then a further triggering event is required to commit the communication event deletion. It should be noted that depending on how the handling of meeting invitations by the unified event manager 260 is configured, additional touches or user input may be required to accept or decline the invitation. By contrast, carrying out the same operations in the view 300 of FIG. 3 requires at least 2n touches, two per communication event. This solution therefore reduces the amount of resource time spent processing user input, and also reduces the amount of time the user must spend interacting with the unified view in order to process these messages. An improved interface with communication events that facilitates message processing by the user may also assist in improving device resource management, since incoming communication events may be processed more promptly, and unneeded events deleted more promptly from their respective data stores 210.

Figure 11:
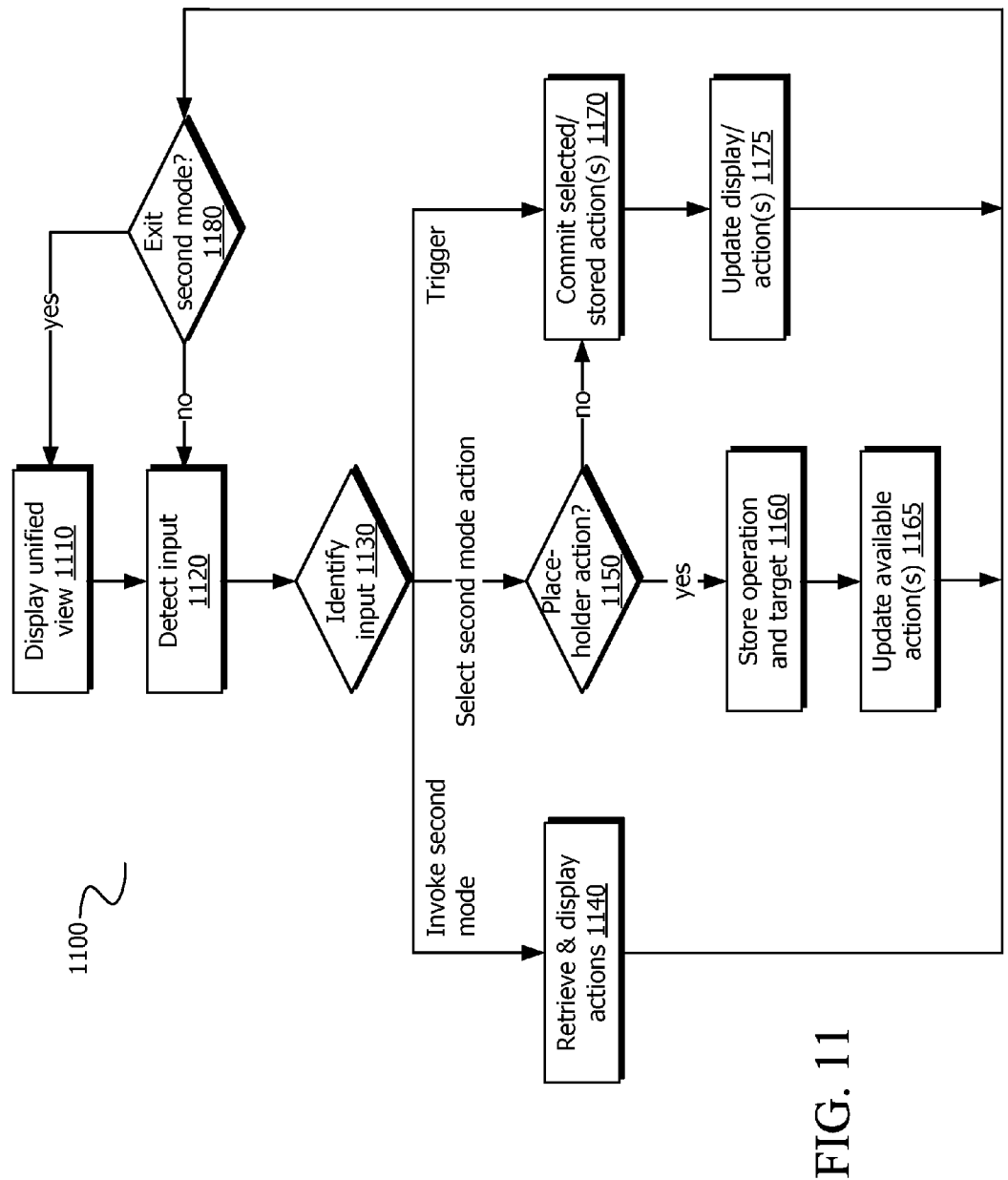
FIG. 11 is a flowchart illustrating a method of operation for the electronic device in the first and second modes.

FIG. 11 is a flowchart illustrating a general method 1100 for implementing the unified communication event view described above on an electronic device 100. At 1110, the initial unified view (e.g., view 300 of FIG. 3A) is displayed in the first mode. At 1120, user input is detected at the electronic device 100. At 1130, the input is identified as one of three general types of input. If the input is identified as a command to invoke the second mode, then at 1140 the unified event manager 260 retrieves the various additional actions that are associated with the different communication event types and/or accounts displayed in the unified view 300, and modifies the view for the second mode, e.g. view 400 of FIG. 4, including user interface elements corresponding to the additional actions. The method 1100 then returns to 1120, where the device 100 awaits further input. A determination is made at 1180 whether the input that had been previously received is a command to exit the second mode, but this determination may be bypassed when unified event manager 260 is already operating in the first mode.

If the input is determined at 1130 to be a selection of a second mode action by actuation of a user interface element, which can occur only when the unified event manager 260 is operating in the second mode and the appropriate unified communication event view (e.g., 400) is displayed, then at 1150 the unified event manager 260 determines whether the action associated with the user interface element is a "placeholder"-type action such as a "delete" action, where an additional triggering event is required before the action is committed. If so, data pertaining to the operation to be carried out, such as an identifier of the target communication event, an identifier of the action to be taken, and optionally an identifier for the custodian application 220, are stored at 1160. Next, the view 400 is updated at 1165 to reflect the currently available actions by changing the displayed user interface elements, as necessary. As summarized in Table 3 above, for example, once a "delete" action is selected, the "delete" action user interface element in the view 400 is replaced with an "undo" action user interface element. The method 1100 then returns to 1120 to await further input.

If the second mode action that was invoked is not a placeholder action, or if the input is identified at 1130 as a triggering event, explained above, then at 1170 the unified event manager 260 commits the selected operations that had been stored previously. Further, any operations that are invoked by the triggering event itself—for example, a selection of a principal user interface element to view a message, to select a particular account to view, etc.—are carried out as well, and the displayed view is updated at 1175 to reflect the currently available actions. At 1180, it is determined whether the second mode is to be exited and the unified event manager 260 is to return to the first mode. If this is the case, the method 1100 returns to 1110, and the view from the first mode is displayed. If not, the method returns to 1120 and awaits further input.

Figure 12:
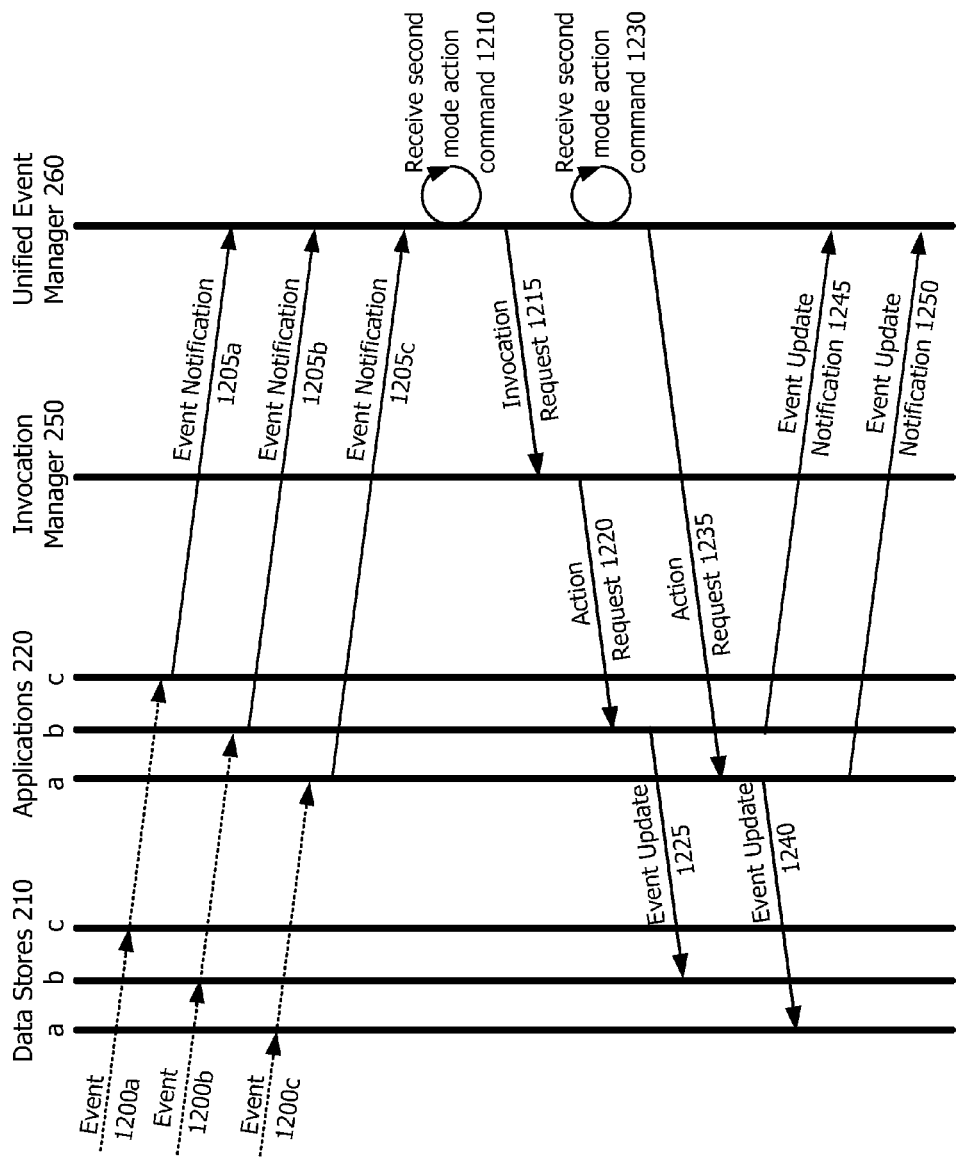
FIG. 12 is an interaction diagram illustrating communication between select components of the electronic device in implementing the second mode of the unified event listing view.

FIG. 12 illustrates the interaction between select components of the electronic device 100, including three example data stores 210 and their corresponding custodian applications 220, the invocation manager 250 (which is optional), and the unified event manager 260. New communication events 1200a, 1200b, and 1200c may be obtained at any time by an application 220 and stored in the appropriate data store 210. The particular mechanism by which the data stores 210 obtain the events is not pertinent, but if the corresponding application 220 did not create the communication event in the data store 210, then the application is notified. The application 220 then notifies the unified event manager 260 by event notification messages 1205a, 1205b, and 1205c that new communication events are available. The notifications may be implemented as described above with respect to FIG. 2, with or without the use of a merged index 230.

While the unified event manager 260 operates in the second mode, it receives commands for actions associated with various communication events as described above. A first command is received at 1210. If necessary, a triggering event is awaited, and then at 1215 the unified event manager 260 passes an invocation request to the invocation manager 250 to implement the relevant operation on the communication event. The invocation request may contain, at a minimum, an identifier for the target communication event, data identifying the action to be taken with any required parameters (e.g., setting a flag, deletion, etc.), and optionally an identifier for the application. The structure of the invocation request may be any suitable structure. As one example, to ensure relative uniqueness of the identifiers and to identify ownership of an action by a particular application, the identifiers may be formatted in a reverse DNS format (e.g., com.acme.appname to identify a target application, and com.acme.action.FLAG to define a "flag" action). The identifier for the target communication event may be in the form of a memory address, unique identifier assigned by the application 220 or data store 210, or a uniform resource indicator (URI). The communication event identifier would have been provided to the unified event manager 260 initially in the event notification 1205a, b, or c. If other parameters are included in the invocation request, they are included in whatever format is required by the invocation manager 250.

The invocation manager 250, having received the request 1215, then identifies the target application 220 and sends an action request 1220 to the application 220 with data obtained from the invocation request. The application 220 executes the request, resulting in an update to the data store 1225 to store the changed attribute or status, or to move or delete the communication event, as the case may be. In this implementation, no confirmation is sent by the application 220 to the invocation manager 250, or from the invocation manager 250 to the unified event manager 260; instead, this implementation relies on the application 220 updating the unified event manager 260 regarding a change to the application's data store 210, as it would during normal operation. In other implementations, an acknowledgement or confirmation message may be sent between the application 220 and the invocation manager 250, or the invocation manager 250 and the unified event manager 260.

FIG. 12 also illustrates a variant in which, after receipt of a second mode action command 1230, the unified event manager 260 sends a request 1235 directly to the custodian application 220, in a manner similar to that described above. In this case, the unified event manager 260 must be provided with the target application identifier. This may be included in the event notification 1205a, b, or c, along with the communication event's own identifier. The remainder of the process is similar; the application updates the communication event 1240 in the data store 1210, and then provides an event update notification 1250 to the unified event manager 260.

Figure 13B:
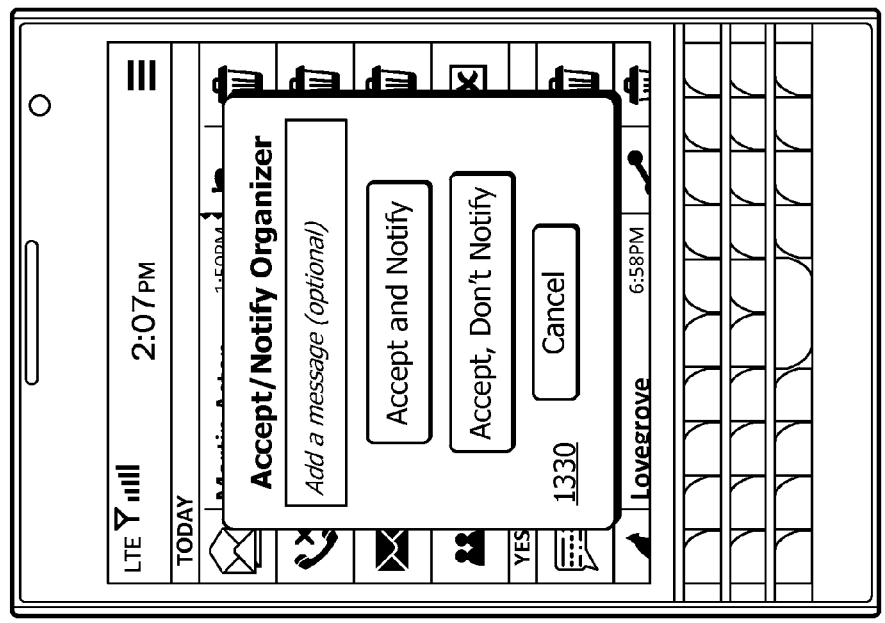
Figure 13A:
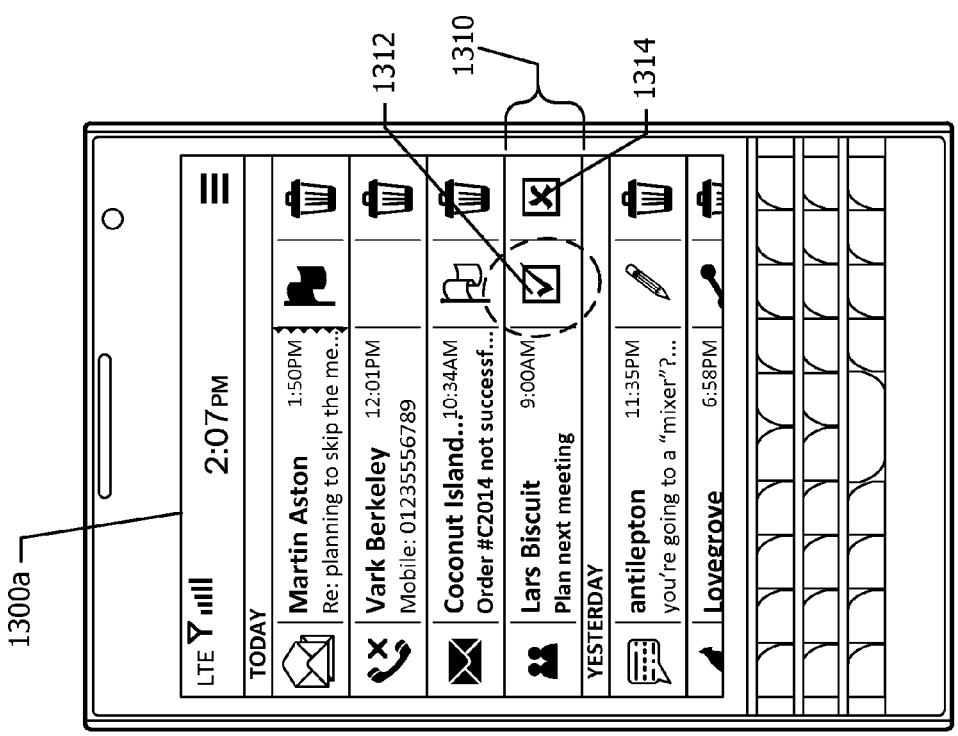

Some actions require the transmission of a message from the electronic device 100, as in the case of accepting or declining a meeting invitation, or sending a reply message. FIGS. 13A to 13C illustrate the handling of calendar events (meeting invitations) in one implementation. In FIG. 13A, a unified communication event view 1300a in the second mode is shown; this is similar to the view 400 of FIG. 4. Communication event listing 1310 includes two action user interface elements in this mode: an accept user interface element 1312, and a decline user interface element 1314. In some embodiments, actuation of either one of these elements 1312, 1314 results in automatic transmission of a response by the appropriate message transport (e.g., email, IM, SMS) without further user intervention. In others, the user is presented with a dialog box to either confirm or add further message content. FIG. 13B shows a possible dialog box 1330 resulting from actuation of the accept user interface element 1312, which permits the user to add optional message content, and to choose to either send an accept message (notification), or accept the invitation without sending an accept message. This dialog box 1330 may be generated by either the unified event manager 260 itself, or by a calendar application or application corresponding to the calendar event on request by the unified event manager 260.

Once the meeting invitation is accepted and the dialog box 1330 is dismissed, the view is updated, as shown in FIG. 13C. View 1300c now provides different action user interface elements in place of the previous accept and decline user interface elements. In FIG. 13C, they have been replaced with a toggling flag user interface element 1313, and a delete user interface element 1315.

Figures 14F, 14G:
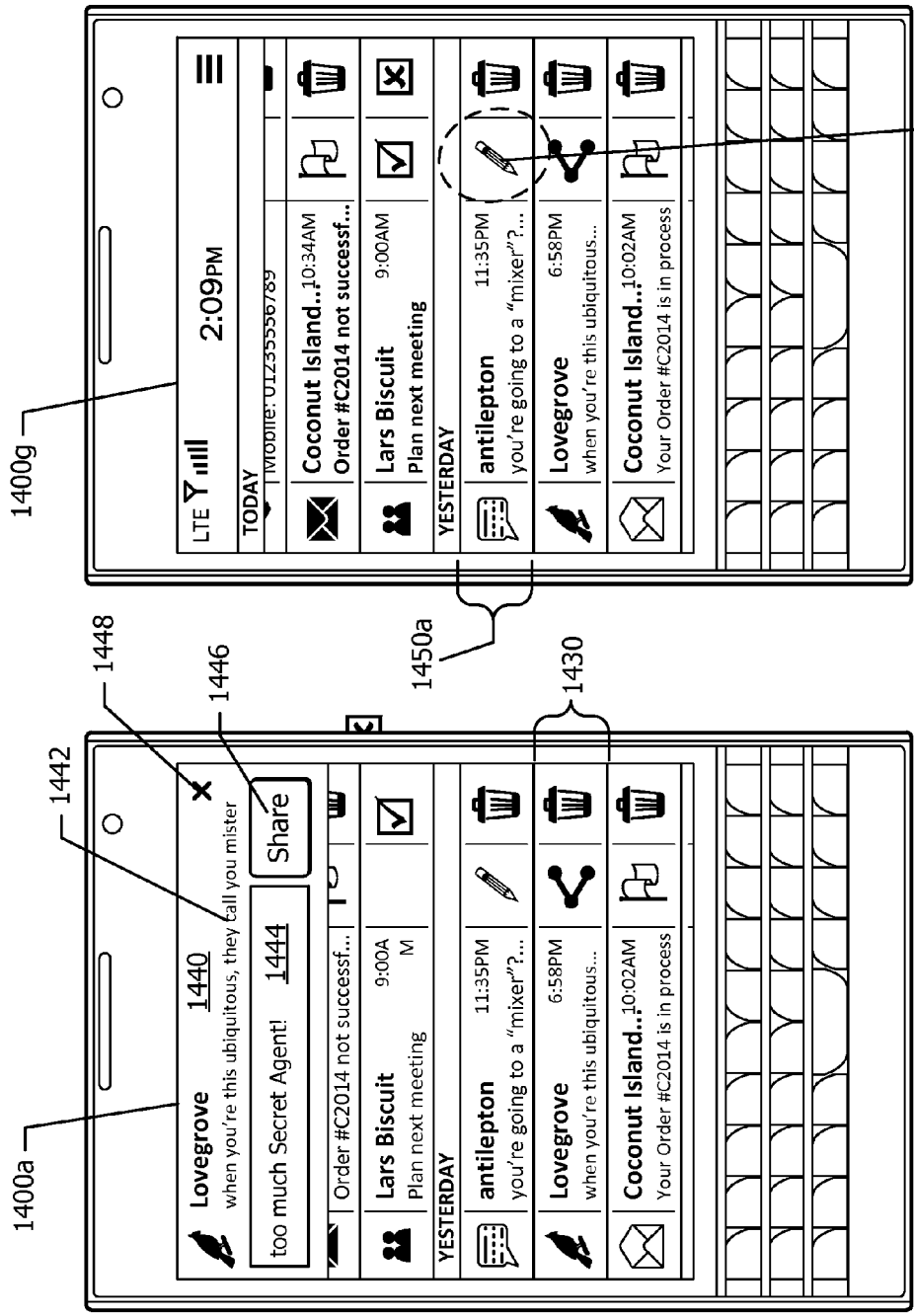

Other cases where transmission of a message can be effected from the unified communication event view is illustrated in FIGS. 14A to 14I. These examples illustrate possible message transmissions in response to IM, social networking, and SMS messages. FIG. 14A illustrates a first view 1400a, again in the second mode, showing a portion of the unified communication event view, including an IM communication event listing 1410a. The view 1400a includes a variety of other communication event types, including email, SMS, and a social networking message. One of the action user interface elements associated with the IM communication event listing 1410a is a "reply" (or "compose") action 1412. In the unified communication event view 1400a, only select information about the IM communication event is visible, such as the correspondent or "buddy" identity, the datestamp, and a preview of the last IM message sent or received. The preview may not include the entire message.

In response to actuation of the "reply" action user interface element 1412, a reply dialog panel is displayed. In FIG. 14B, this is displayed as an overlay 1420 over the view 1400a. The overlay 1420 in this example includes the complete previous IM message 1422, an input field for entering message content 1424, a "send" user interface element 1426 for initiating transmission of the reply message with any input message content, and a "close" or "cancel" user interface element 1428 that can be actuated to dismiss the overlay 1420. Alternatively, the overlay may be dismissed by a detected touch on the portion of the screen not occupied by the overlay. The overlay may be generated by the unified event manager 260, or alternatively it may be generated by the application associated with the communication event in response to an invocation request received directly from the unified event manager 260 or the invocation manager 250. Either way, additional communication event data may have been retrieved from the associated data store 210 in order to present the complete message in the overlay 1420. As can be seen from the drawings, while the overlay is displayed and receiving input, at least part of the underlying unified communication event view 1400a is still at least partially visible. The overlay 1420 may extend over the entire display screen, but the data entry portion of the overlay 1420 (e.g., elements 1422-1428) only occupy a portion of the screen. The rest of the overlay 1420 may be defined with a level of transparency so that the listings in the view 1400a remain legible, although not currently capable of receiving focus or being actuated. In other implementations, the overlay 1420 may completely obscure the underlying view 1400a.

FIG. 14C illustrates the overlay 1420 over the view 1400a after some text has been input in the input field 1424. In some embodiments, additional features may be made available for message composition, such as rich text formatting, emoticons, stickers, options for attaching media files or calendar invitations, and so on. In response to actuation of the "send" user interface element 1426, the relevant application creates the message and initiates transmission from the device 100. Since a new message has been created, it is stored in the associated data store 210, and a notification is ultimately provided to the unified event manager 260 of the new message. Accordingly, the unified event manager 260 updates the view 1400d, as can be seen in FIG. 14D. The communication event listing 1410a has now been replaced with listing 1410b, which has been moved to the top of the communication event listings in 1400d since the listings are ordered in reverse chronological order (as is generally done in the art), and this newly-transmitted message has the most recent time stamp. In some implementations, sent messages are omitted from the unified view; in that case, the position of the communication event listing may not change in the view. In the example of FIG. 14D, the unified event manager 260 has also automatically exited the second mode once the message was transmitted. However, it may be desirable to maintain the unified event manager 260 in the second mode even after the message has been transmitted, as is the case in the next example.

FIG. 14E again depicts the original view 1400a from FIG. 14A. In this figure, a social networking message or post 1430 is indicated. This communication event listing includes two action user interface elements, one of which is a "share" action 1432. In this example, it is presumed that the social networking platform does not support direct messaging, and that users "share" posts by posting them to their own accounts, optionally with a suitable reference back to the original user who posted the message.

In response to actuation of the user interface element 1432, an overlay 1440 is generated and displayed over top of the view 1400a, as shown in FIG. 14F. As discussed above, the overlay 1440 may be generated by the unified event manager 260, or it may be generated by the application 220 corresponding to the communication event type. The overlay 1440 again includes the complete social network message 1442, an input field for entering message content 1444, a "share" user interface element 1446 for initiating transmission of the reply message with any input message content, and an optional "close" or "cancel" user interface element 1448. Once content is input in the input field 1444 and the "share" action is invoked, the corresponding application 220 generates a post or message which in this case is addressed to the user's own account, and the post or message is transmitted from the electronic device 100 to the social networking service. In this particular example, it is presumed that a user will not receive notification of his own posts; therefore, there is no resultant change to the view 1400a.

FIGS. 14G to 14I illustrate the third example of an SMS message sent in reply to a received message. View 1400a is again shown in FIG. 14G, but in this figure an SMS communication event listing 1450a is indicated. This communication event listing includes a "reply" or "compose" action user interface element 1452 in the second mode.

When this element is actuated, once again an overlay 1460 is invoked and displayed over the view 1400a, as shown in FIG. 14H. Again, the source of this overlay 1460 may be the unified event manager 260, or the relevant application 220. The overlay 1460 may include similar components as the example overlay 1420; the most recent message displayed in full 1462, an input field for message content 1464, and a "send" user interface element 1466. Once message content is input and the "send" command actuated, the relevant application 220 constructs and transmits the reply message; then, as can be seen in FIG. 14I, the view is updated, and communication event listing 1450a is removed, and replaced by listing 1450b in the position of the most recent message on the device. In the example of FIG. 14I, the final view 1400i is not in the second mode anymore, as the unified event manager 260 automatically transitioned to the first mode; however, it may be desirable to maintain the second mode as mentioned above, to permit the user to quickly access similar reply actions for other messages.

In any of these examples, the overlay 1420, 1440, 1460 may be configured to permit the user to select additional addressees of the message, if direct addressing is supported by the communication type.

Conventionally, SMS and IM messaging applications, as well as those directed to email and other formats, do not permit responses to be input from an inbox screen without first displaying the recent messages in the history of the SMS or IM conversation. Thus, in a conventional touchscreen device, it takes an additional user action to arrive at a "send" button or other user interface element for sending a reply message, as the user must first load the SMS or IM application screen to view previous messages. In these examples, however, the user is able to quickly initiate a reply to any supported message within the same unified communication event view without having to first invoke a view of the message or conversation, even if the conversation has aged and is not recently received. Furthermore, the user is able to respond to messages of multiple types in serial from the same unified communication event view.

Figure 15:
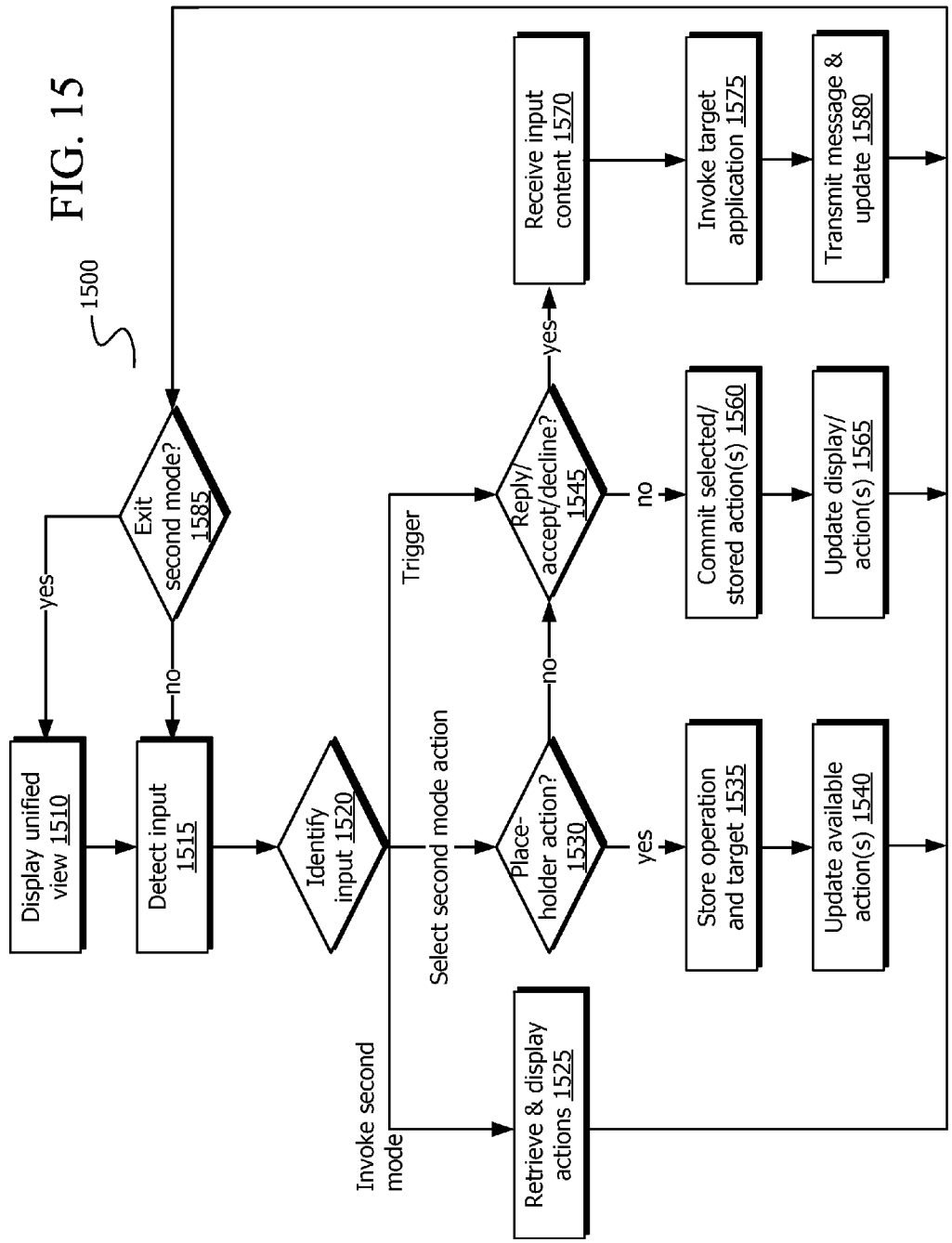
FIG. 15 is a flowchart illustrating a method of operation for the electronic device in the unified event listing view while carrying out a reply and other operations.

FIG. 15 is a flowchart illustrating a general method 1500 implementable by the electronic device 100 to carry out the quick reply functions and calendar event handling functions described with relation to FIGS. 13A to 14I. At 1510, the initial unified view (e.g., view 300 of FIG. 3A) is displayed in the first mode. At 1515, user input is detected at the electronic device 100. At 1520, the input is identified as one of three general types of input. If the input is identified as a command to invoke the second mode, then at 1525 the unified event manager 260 retrieves the various additional actions that are associated with the different communication event types and/or accounts displayed in the unified view 300, and modifies the view for the second mode, e.g. view 400 of FIG. 4, including user interface elements corresponding to the additional actions. The method 1500 then returns to 1515, where the device 100 awaits further input. A determination is made at 1585 whether the input that had been previously received is a command to exit the second mode, but this determination may be bypassed when unified event manager 260 is already operating in the first mode.

If the input is determined at 1520 to be a selection of a second mode action by actuation of a user interface element, which can occur only when the unified event manager 260 is operating in the second mode and the appropriate unified communication event view (e.g., 400) is displayed, then at 1530 the unified event manager 260 determines whether the action associated with the user interface element is a "placeholder"-type action such as a "delete" action, where an additional triggering event is required before the action is committed. If so, data pertaining to the operation to be carried out, such as an identifier of the target communication event, an identifier of the action to be taken, and optionally an identifier for the custodian application 220, are stored at 1535. Next, the view 400 is updated at 1540 to reflect the currently available actions by changing the displayed user interface elements, as necessary. As summarized in Table 3 above, for example, once a "delete" action is selected, the "delete" action user interface element in the view 400 is replaced with an "undo" action user interface element. The method 1500 then returns to 1515 to await further input.

If the second mode action that was invoked by the input is not a placeholder action, nor a reply or accept/decline action, then at 1560 the unified event manager 260 commits any selected operations that had been stored previously. Further, any operations that are invoked by this second mode action are also carried out at 1560, and the displayed view is updated at 1565 before returning to 1585 and 1515 to await further input. If the second mode action is indeed a reply or an accept/decline action, then the overlay 1420, 1440, 1460 as applicable is displayed and input content is received at 1570. The target application that will send the message is invoked at 1575, and the message is transmitted at 1580, and the unified communication event view is updated accordingly. Note, however, that if the overlay is generated and managed by the application rather than the unified event manager 260, then the target application will be invoked prior to receiving input content. The method then returns to 1585 and 1515.

If the input identified at 1520 is a triggering event and is not a reply or accept/decline action, then the method again returns to 1560 and 1565 before returning to 1585 and 1515.

At 1585, it is determined whether the second mode is to be exited and the unified event manager 260 is to return to the first mode. If this is the case, the method 1500 returns to 1510, and the view from the first mode is displayed. If not, the method returns to 1515 and awaits further input.

Figure 16:
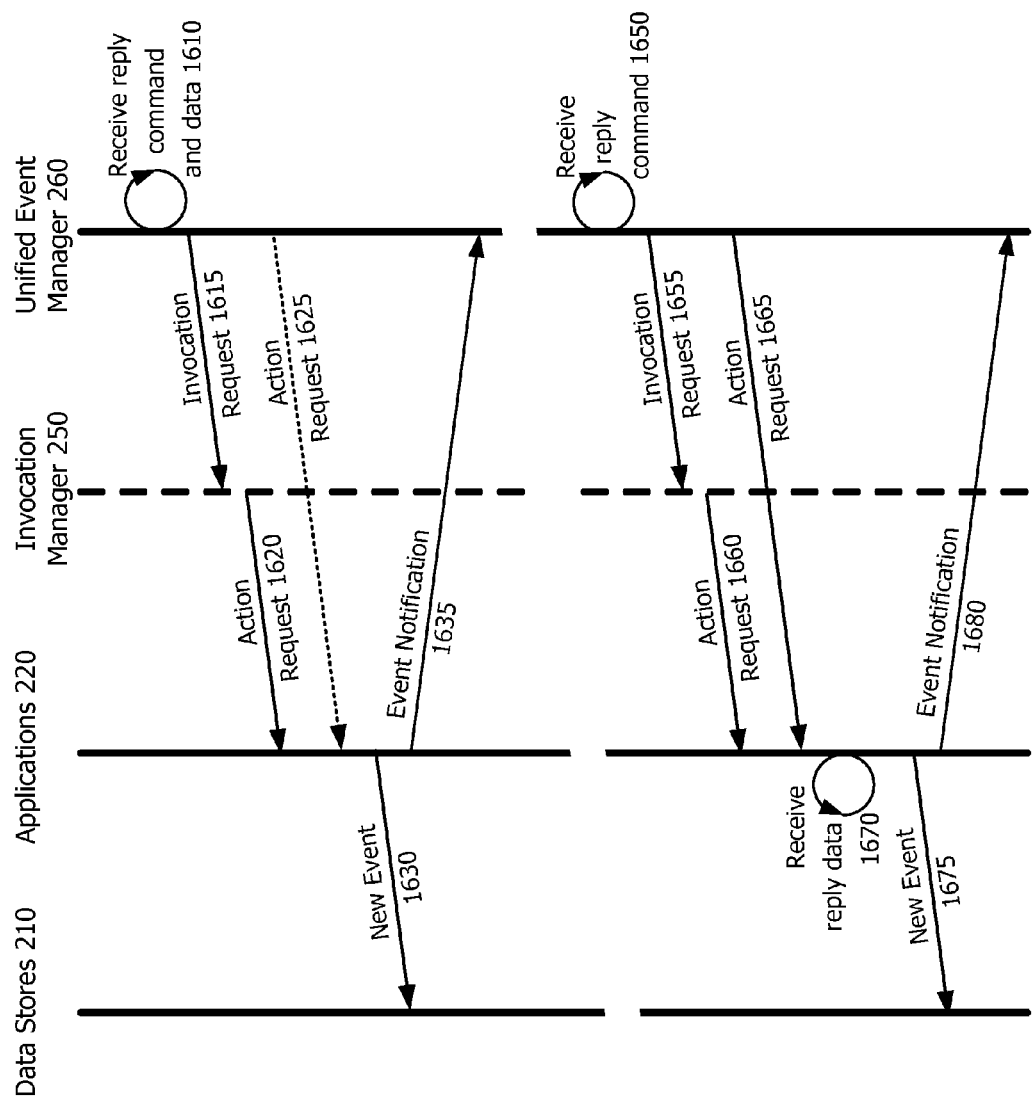
FIG. 16 is an interaction diagram illustrating communication between select components of the electronic device in implementing the reply operation of FIGS. 14A to 14I.

FIG. 16 illustrates interaction between the data store 210, application 220, invocation manager 250, and unified event manager 260 in implementing quick replies and accept/decline actions while the unified event manager 260 is operating in the second mode. This interaction diagram describes two possible implementations: one in which the unified event manager 260 collects the necessary data (e.g., message content input, previous message content, etc.) and generates the overlay or dialog box for inputting the reply message, and another in which the unified event manager 260 calls the application 220 to carry out these tasks.

Starting with the first example implementation, the unified event manager 260 receives a command to initiate a reply (or an accept/decline) action, as well as input content for generating the reply, at 1610. The unified event manager 260 sends an invocation request 1615 to the invocation manager 250. The invocation request 1615 and its data may take a form as described above in relation to FIG. 12, and will include identifiers for the communication event to which a reply is to be generated, the target application, the action to be taken, and the message content. The unified event manager 260 must also encode the data in a form acceptable to the invocation manager 250 and/or the target application 220, or at least specify in the invocation request the encoding or format used for the data that is submitted. In one implementation, the unified event manager 260 may temporarily store the input message content in memory, and may simply include a URI or other address for the stored input message content in the invocation request.

The invocation manager 250 then constructs and sends an action request 1620 to the application 220 that owns the data store 210 associated with the communication event type, using the data received in the invocation request. Alternatively, the invocation manager 250 may be omitted from the device, in which case the unified event manager 260 must generate and send an action request 1625 directly to the target application 220.

The application 220, in response to the action request 1620 or 1625, generates a new communication event based on the received data which is stored in the data store 210, and transmits the event from the device. The application 220 thereafter notifies the unified event manager 260 of the change to the data store 210 by message 1635. The unified event manager 260 can then update its view to reflect the sent message.

Alternatively, the reply data may be collected by the application 220. In the second example illustrated in FIG. 16, the unified event manager 260 receives the reply command at 1650. However, instead of collecting data for the reply, the unified event manager 260 instead transmits an invocation request 1655 to the invocation manager 250. This request would include an identifier of the target communication event and the target application, as well as an identifier of the action to be taken. In this case, however, there is no occasion for the unified event manager 260 to format and transmit message content as part of the invocation request.

The invocation manager 250 then sends an action request 1660 to the relevant application 220, as described above. Also as described above, in some implementations the invocation manager 250 is omitted, in which case an action request 1665 is constructed and sent directly by the unified event manager 260 to the application 220. Either way, if the application 220 is not already executing on the electronic device 100, the invocation manager 250 will cause the application 220 to launch.

The application 220, having received the action request 1660 or 1665, then generates a screen or partial screen comprising the necessary input fields for receiving message content. This screen is pushed to the top of the display stack, overlaying the unified communication event view. The application 220 then receives the input content for the reply, and with this data generates a new event 1675 and stores it in the data store 210. The event is then transmitted form the device, and the application 220 notifies the unified event manager 260 of the change to the data store with by message 1680. Finally, the unified event manager 260 can update its view to reflect the sent message.

Figures 17A, 17B:
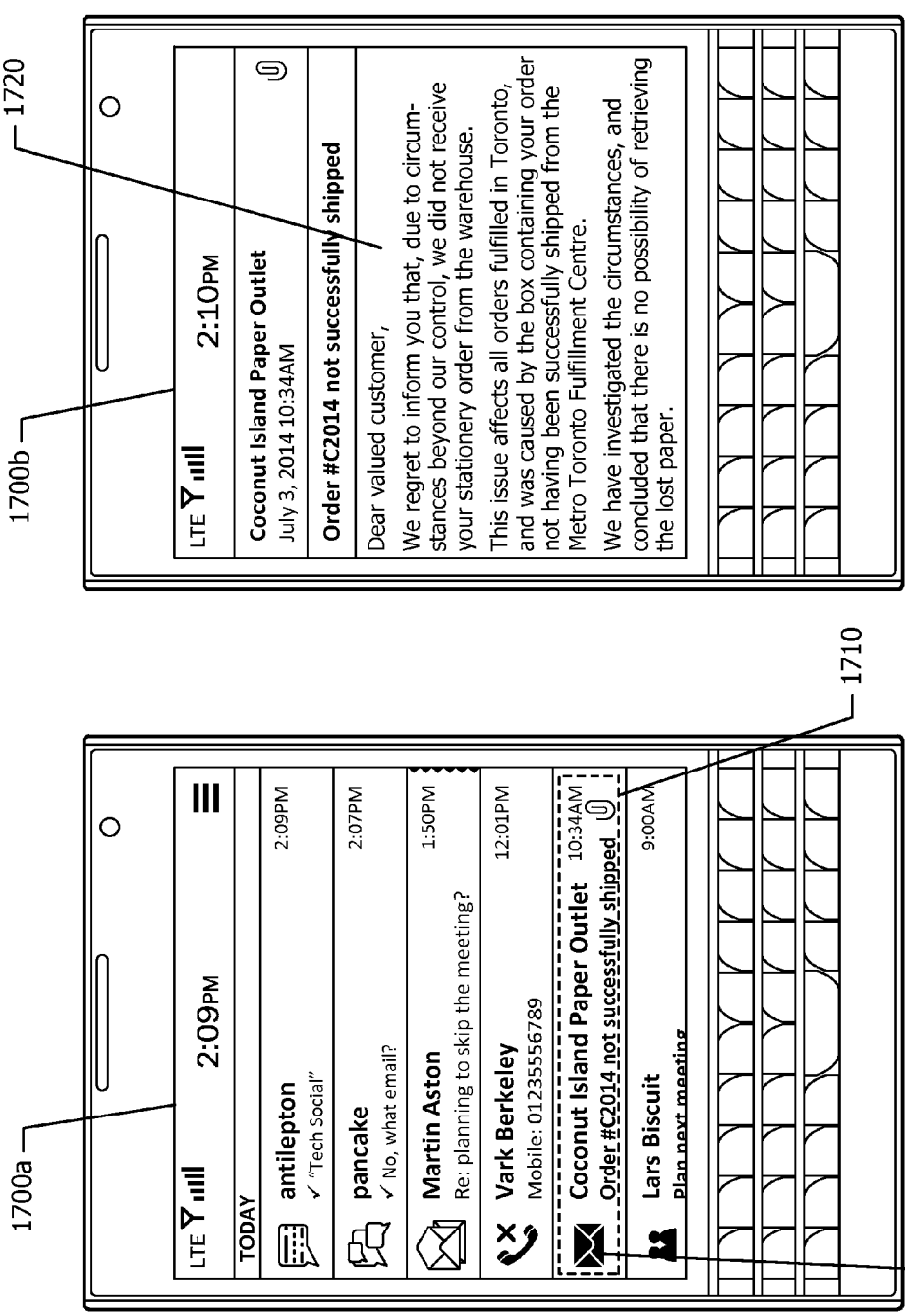

The unified communication event view may be further adapted to conveniently provide the user with access to additional actions for only a particular communication event, such as the last-viewed communication event, even when the unified event manager 260 is operating in the first mode. Turning to FIG. 17A, an initial, first mode view 1700a is shown. In this view, one communication event listing, such as listing 1710, is selected by the user for viewing, for example by actuating the listing's main user interface element to initiate the view operation. This initial step may take place while the view 1700a is in the second mode.

In response to the actuation, the communication event content and metadata is retrieved from the appropriate communication event store 210, and presented in a message view 1700b, as can be seen in FIG. 17B. This view overlays or replaces the unified view 1700a, and contains the retrieved message content and metadata 1720.

Once the user has finished with the message view 1700b, the view may be dismissed from the display screen. The dismissal may be initiated by any suitable predefined action, such as a keypress, sideways scroll, etc. In the example of FIG. 17C, it can be seen that the message view may be dismissed by a swipe gesture on the message view 1700b, as indicated by the arrow in FIG. 17C. Once the message 1720 has been viewed for at least a predefined period of time, it is deemed "read", and this attribute of the message is toggled as necessary and the stored copy of the message is updated. Thus, in FIG. 17C, it can be seen that the icon 1712' associated with the message 1720 has been changed (as compared to icon 1712 in FIG. 17A) to reflect its new "read" status.

When the message view 1700b has been dismissed, the unified communication event view 1700d is redisplayed; however, in this embodiment, the view 1700d is not identical to the view 1700a that was initially displayed, in that it includes further user interface elements for additional actions (in addition to the visual change to the icon in the user interface element 1712). The single communication event listing that was acted on in FIG. 17A-17B is now replaced with a multi-action communication event listing 1730, as can be seen in FIG. 17D. This communication event listing 1730 resembles the communication event listings used in the unified view 400 in the second mode, with three or more actuatable user interface elements. Similar to the communication event listing 440, in this example the listing 1730 includes a first toggle user interface element 1732, which may be used to toggle the state of the communication event between a read and unread state; a main user interface element 1734, which as before may be actuated to initiate the message view 1700b; and at least one additional action user interface element 1736, 1738. These additional action user interface elements may be allocated in the same manner as described above in respect of the operation of the second mode for the unified view; in this case, though, only the last-viewed communication event listing is altered in this manner. The operation of the unified event manager 260 and the user interface elements included in the listing 1730 is similar to that described above, with an additional triggering event, discussed below.

FIGS. 17E and 17F illustrate the operation of the "file" user interface element 1736 that was described above. Once the element 1736 (shown in FIG. 17D) is actuated, the corresponding communication event may be filed automatically to the folder or category last designated by the user. If this is the first time an event has been filed, then the user may be prompted to select a destination folder or category. The view 1700d then updates to the view 1700e of FIG. 17E, which has now replaced the previous communication event listing 1730 with a placeholder listing 1740. The placeholder listing 1740 replaces the two original additional "file" and "delete" user interface elements 1736, 1738 to a "move" and "undo" element 1747, 1749 respectively. Actuation of the "move" user interface element may result in a dialog box being presented to permit the user to select an alternate destination for the communication event. Actuation of the "undo" element reverses the "file" command.

As discussed above, for those actions with a measure of permanence such as deletion or filing/moving a file, the action is not committed before giving the user an opportunity to undo or abort the operation. In the case of the second mode operation described above, the placeholder remains in the unified view until a triggering event is detected, such as a termination of the second mode or actuation of another user interface element in the unified view. In this implementation of the placeholder for the last-viewed communication event, a further timeout triggering event is added. A timeout period is set to be long enough to permit the user enough time to actuate one of the additional user interface elements (e.g., 3500 milliseconds). The period may run from the time that the placeholder listing 1740 is initially displayed, or else from the latest time that the user interacted with the listing 1740. As can be seen in FIG. 17F, once the timeout period expires without any further action by the user, the file action is committed, the placeholder listing 1740 is removed from the view 1700f, and communication event listing 1750, which was positioned below listing 1710, 1730, and 1740, moves up in the unified view 1700f.

FIGS. 17G and 17H illustrate an implementation of the "delete" action in this last-viewed communication event embodiment. View 1700g in FIG. 17G is the same as view 1700d in FIG. 17D; however, in this case, the "delete" action user interface element 1738 is actuated. The result, as can be seen in FIG. 17H, is that the unified view 1700h has been altered to replace the previous communication event listing 1730 with a placeholder listing 1760, similar to the placeholder listing 1740. This placeholder listing 1760 can include an "undo" user interface element, and again, if the timeout period expires without the user taking any further action, the communication event deletion will be committed, and the placeholder listing 1760 will be removed from the unified view.

Optionally, an interactive "toast" or notification is also displayed as the result of a deletion or a file action. An example of a toast 1770 is illustrated in FIG. 17H. The toast overlays a portion of the unified view 1700h, and includes an "undo" user interface element 1772 that may be actuated to reverse the deletion. If a toast is used, then the timeout period may run from the time the toast is initially displayed.

The modified, multi-action communication event listing that replaces the original communication event listing for the last-viewed event need not be limited to the "delete" and "file" actions. The additional action user interface elements may be associated with any set of one or more suitable operations for the communication event type, such as a "flag" or "reply" action, in the manner described above.

Figure 18:
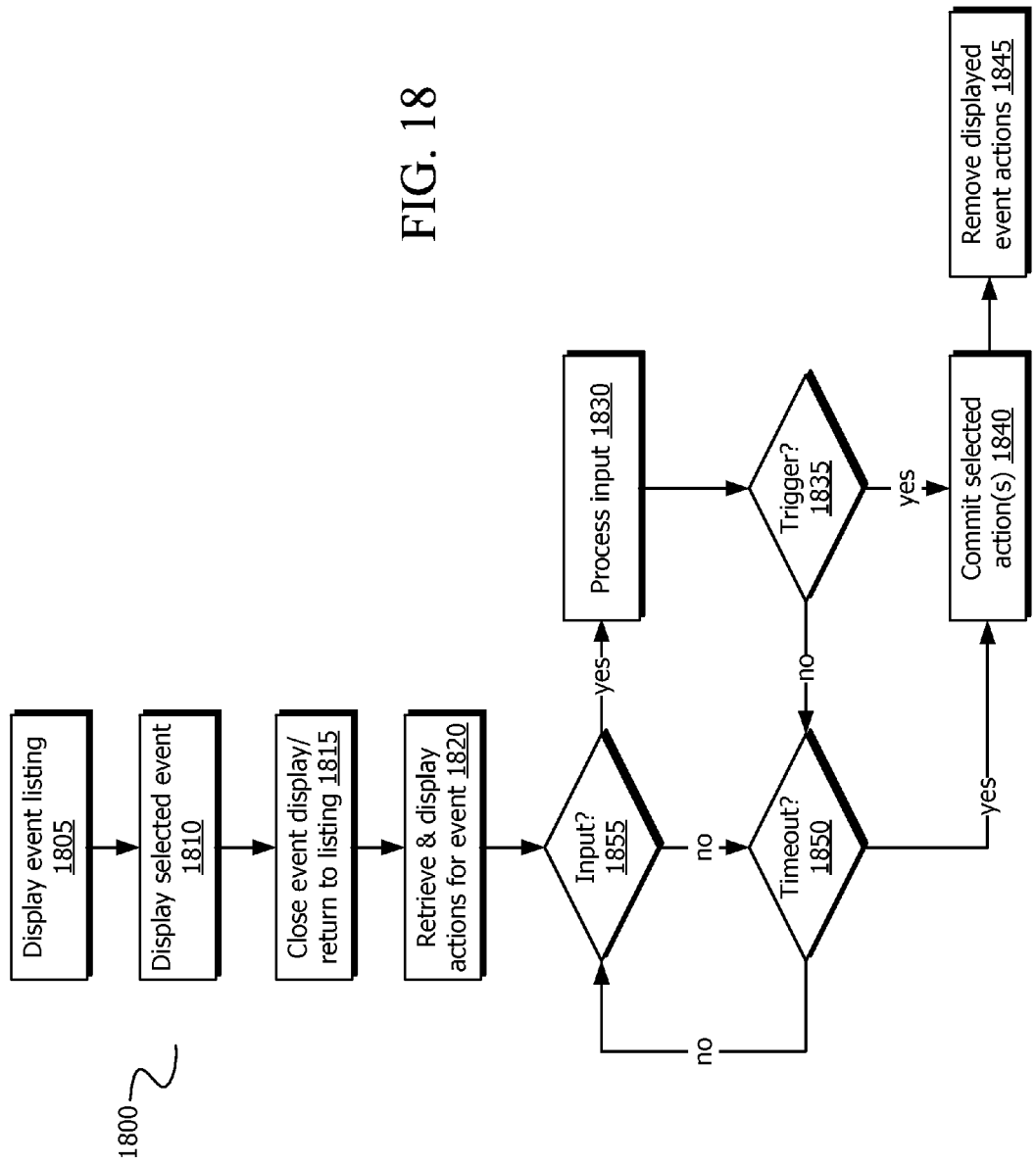
FIG. 18 is a flowchart illustrating a method of operation for the electronic device when implementing the views of FIGS. 17A to 17H.

FIG. 18 is a flowchart illustrating a method of operation 1800 for the device 100 in this embodiment. At 1805, the unified communication event view is initially displayed, in either the first or second mode. At 1810, in response to a user command, a single selected communication event is displayed. It should be noted that in the case where the unified view is configured to display messages collated in conversations or other groupings, the single selected communication event may be a grouping of communication events. At 1815, the display of the selected communication event is closed or dismissed, and the unified view is updated by retrieving information about the actions applicable to the last-viewed event, and modifying the view to include corresponding user interface elements to the listing for the last-viewed event, at 1820.

At 1825, the unified event manager 260 waits for input. When input is received, at 1830, it is processed. Depending on the input, this may result in removal of the additional actions for the last-viewed event. Thus, at 1835, it is determined whether the input is a triggering event (e.g., termination of the current display mode, or actuation of another user interface element for another event). If so, the actions that had been selected or stored are committed at 1840, and the view is updated at 1845 to remove the additional actions. If the action is determined not to be a triggering event at 1835, then at 1850 it is determined whether a timeout has expired. If it has, then again, actions that had been stored or selected are committed at 1840, and the view is updated at 1845 to reflect the changes. As long as the timeout period has not expired, however, the device 100 will await further input for the user interface elements displayed for the last-viewed event.

The description above has referenced the retrieval of actions associated with specific communication event types or user accounts, and the generation of various views for data presentation and capture. Generally, when the unified event manager 260 is configured to generate all of these views, it must still obtain data from data stores 210 or applications 220. Communication event content and metadata, used in generating the underlying unified views or overlays for displaying IM or SMS messages and receiving input text, may be obtained from the data stores 210, or from the merged index 230. Icons for use in the unified view that denote a communication event's MIME type (e.g., the icons used in user interface elements 442 and 502 in FIGS. 4 and 5A) may be defined within the unified event manager 260. The unified event manager 260's data may also include icons or other graphic elements representing specific actions, such as "reply", "forward", and "delete". However, information about which communication event actions (e.g., "flag") should be included or excluded from the second mode or the last-viewed interface may need to be defined by the application, if not already defined within the unified event manager 260 or if the application's communication event type is new to the unified event manager 260. This may occur on registration or installation of the application on the device 100. When the application is installed, it may be configured to notify the invocation manager 250, unified event manager 260, and any other required component, that is configured to receive action requests (from the invocation manager or unified event manager 260), and what account and communication event actions it supports, together with address information so that the unified event manager 260 can accurately construct invocation requests identifying the application's data and functions. The unified event manager 260 may store this data in its own memory space for later retrieval whenever a new unified view is to be generated. Thus, when the unified event manager 260 constructs a view in either the first or second mode, it may query the merged index 230 or conversation manager 240 (or individual data stores 210) for communication event data to be included in each listing; and based on the identified communication event type, it may select the appropriate icons and actions for inclusion in user interface elements.

Not every action need necessarily be declared by an application as being a supported action. For instance, deletion of messages may be considered to be a universal action, in which case the unified event manager 260 may be configured to include the "delete" action as a choice in all renderings of the unified view.

The examples and embodiments are presented only by way of example and are not meant to limit the scope of the subject matter described herein. Variations of these examples and embodiments will be apparent to those in the art, and are considered to be within the scope of the subject matter described herein. For example, some steps or acts in a process or method may be reordered or omitted, and features and aspects described in respect of one embodiment may be incorporated into other described embodiments. Further, while the foregoing examples were described and illustrated with reference to a handheld mobile device with a touchscreen interface, they may be implemented with suitable modification on a computing device with a larger display screen or without a touchscreen interface. Where a touchscreen interface is not employed, user input via the graphical user interface may be received from a pointing device and/or a keyboard. Further, while these examples have been illustrated in the context of a full-screen application, where the unified event listing view fills an entirety of the available screen space allocated to application views, these examples may be modified for use in an environment in which applications are displayed only in a window or portion of the screen (i.e., not occupying the entire display screen).

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Throughout the specification, terms such as "may" and "can" are used interchangeably. Use of any particular term should not be construed as limiting the scope or requiring experimentation to implement the claimed subject matter or embodiments described herein. The language of this disclosure should not be construed as a commitment to a "promise" to be fulfilled by the invention(s). Any suggestion of substitutability of the electronic device for other implementation means should not be construed as an admission that the invention(s) described herein are abstract, or that the electronic device or its components are non-essential to the invention(s) described herein. Further, while this disclosure may have articulated specific technical problems that are addressed by the invention(s), the disclosure is not intended to be limiting in this regard; the person of ordinary skill in the art will readily recognize other technical problems addressed by the invention(s).

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

The invention claimed is:

1. A method implemented by an electronic device, the method comprising:
    displaying, on a display screen, a view comprising a plurality of communication event listings corresponding to a plurality of communication events, the plurality of communication events comprising a plurality of communication event types or a plurality of accounts, the view being initially displayed in a first mode,
    each displayed listing of the view in the first mode comprising a user interface element for initiating a first action operating on its corresponding communication event;
    in response to a command to invoke a second mode for the view, displaying the view in the second mode,
    each displayed listing of the view in the second mode comprising a user interface element for initiating the first action and at least one additional user interface element for initiating an additional action operating on the corresponding communication event, different sets being provided for communication events of different communication event types or different accounts; and
    in response to receiving a selection of one of the plurality of communication event listings in the first mode:
        displaying content associated with the selected communication event in a message view; and
        when the message view is dismissed, redisplaying the first mode, with only the displayed listing for the selected communication event comprising a user interface element for initiating the first action and at least one additional user interface element for initiating an additional action operating on the selected communication event,
    wherein, in the first mode, at least one displayed listing comprises an indicator icon element, and wherein in the second mode, the indicator icon element converts to an actuatable user interface element for initiating a further action operating on the corresponding communication event, the converted user interface element being different from the user interface element for initiating the first action and the at least one additional user interface element for initiating an additional action.

2. The method of claim 1, wherein the second mode user interface element for initiating the first action is a resized version of the first mode user interface element.

3. The method of claim 1, wherein the display screen comprises a touchscreen interface, and each of the first mode user interface element for initiating the first action, second mode user interface element for initiating the first action, and the at least one additional user interface element are each actuatable to initiate their corresponding action by a touch.

4. The method of claim 1, wherein the view is generated by a unified event application executing on the electronic device, and wherein the method further comprises, while in the second mode:
    detecting actuation of one of the additional user interface elements; and
    providing a request to a dedicated application to execute the action on the communication event corresponding to the additional user interface element, the dedicated application being associated with the communication event type or account of the communication event.

5. The method of claim 1, wherein the view is generated by a unified event application executing on the electronic device, and wherein the method further comprises, while in the second mode:
detecting actuation of one of the additional user interface elements;
storing data for initiating the action associated with the actuated additional user interface element; and
on detection of a trigger, providing a request to a dedicated application to execute the action on the communication event corresponding to the additional user interface element, the dedicated application being associated with the communication event type or account of the communication event, the trigger comprising either:
actuation of another user interface element in the view; or
a command to invoke the first mode in place of the second mode.

6. The method of claim 1, wherein the further action comprises a toggle between a read state and an unread state.

7. The method of claim 1, wherein the first action comprises a viewing operation for the corresponding communication event.

8. A non-transitory electronic device-readable medium bearing code which, when executed by one or more processors of an electronic device, causes the electronic device to implement the method of:
displaying, on a display screen, a view comprising a plurality of communication event listings corresponding to a plurality of communication events, the plurality of communication events comprising a plurality of communication event types or a plurality of accounts, the view being initially displayed in a first mode,
each displayed listing of the view in the first mode comprising a user interface element for initiating a first action operating on its corresponding communication event;
in response to a command to invoke a second mode for the view, displaying the view in the second mode,
each displayed listing of the view in the second mode comprising a user interface element for initiating the first action and at least one additional user interface element for initiating an additional action operating on the corresponding communication event, different sets being provided for communication events of different communication event types or different accounts; and
in response to receiving a selection of one of the plurality of communication event listings in the first mode:
displaying content associated with the selected communication event in a message view; and
when the message view is dismissed, redisplaying the first mode, with only the displayed listing for the selected communication event comprising a user interface element for initiating the first action and at least one additional user interface element for initiating an additional action operating on the selected communication event,
wherein, in the first mode, at least one displayed listing comprises an indicator icon element, and wherein in the second mode, the indicator icon element converts to an actuatable user interface element for initiating a further action operating on the corresponding communication event, the converted user interface element being different from the user interface element for initiating the first action and the at least one additional user interface element for initiating an additional action.

9. The non-transitory electronic device-readable medium of claim 8, wherein the second mode user interface element for initiating the first action is a resized version of the first mode user interface element.

10. The non-transitory electronic device-readable medium of claim 8, wherein the display screen comprises a touchscreen interface, and each of the first mode user interface element for initiating the first action, second mode user interface element for initiating the first action, and the at least one additional user interface element are each actuatable to initiate their corresponding action by a touch.

11. The non-transitory electronic device-readable medium of claim 8, wherein the view is generated by a unified event application executing on the electronic device, and wherein the method further comprises, while in the second mode:
detecting actuation of one of the additional user interface elements; and
providing a request to a dedicated application to execute the action on the communication event corresponding to the additional user interface element, the dedicated application being associated with the communication event type or account of the communication event.

12. The non-transitory electronic device-readable medium of claim 8, wherein the view is generated by a unified event application executing on the electronic device, and wherein the method further comprises, while in the second mode:
detecting actuation of one of the additional user interface elements;
storing data for initiating the action associated with the actuated additional user interface element; and
on detection of a trigger, providing a request to a dedicated application to execute the action on the communication event corresponding to the additional user interface element, the dedicated application being associated with the communication event type or account of the communication event, the trigger comprising either:
actuation of another user interface element in the view; or
a command to invoke the first mode in place of the second mode.

13. The non-transitory electronic device-readable medium of claim 8, wherein the further action comprises a toggle between a read state and an unread state.

14. The non-transitory electronic device-readable medium of claim 8, wherein the first action comprises a viewing operation for the corresponding communication event.

15. An electronic device, comprising:
at least one communication subsystem;
a display screen; and
at least one processor, the at least one processor being configured to:
display, on a display screen, a view comprising a plurality of communication event listings corresponding to a plurality of communication events, the plurality of communication events comprising a plurality of communication event types or a plurality of accounts, the view being initially displayed in a first mode,
each displayed listing of the view in the first mode comprising a user interface element for initiating a first action operating on its corresponding communication event;

in response to a command to invoke a second mode for the view, display the view in the second mode,
  each displayed listing of the view in the second mode comprising a user interface element for initiating the first action and at least one additional user interface element for initiating an additional action operating on the corresponding communication event, different sets being provided for communication events of different communication event types or different accounts; and
in response to receiving a selection of one of the plurality of communication event listings in the first mode:
  displaying content associated with the selected communication event in a message view; and
  when the message view is dismissed, redisplaying the first mode, with only the displayed listing for the selected communication event comprising a user interface element for initiating the first action and at least one additional user interface element for initiating an additional action operating on the selected communication event,
wherein, in the first mode, at least one displayed listing comprises an indicator icon element, and wherein in the second mode, the indicator icon element converts to an actuatable user interface element for initiating a further action operating on the corresponding communication event, the converted user interface element being different from the user interface element for initiating the first action and the at least one additional user interface element for initiating an additional action.

16. The electronic device of claim 15, wherein the view is generated by a unified event application executing on the electronic device, and wherein the at least one processor is further configured to, while in the second mode:
  detect actuation of one of the additional user interface elements; and
  provide a request to a dedicated application to execute the action on the communication event corresponding to the additional user interface element, the dedicated application being associated with the communication event type or account of the communication event.

17. The electronic device of claim 15, wherein the view is generated by a unified event application executing on the electronic device, and wherein the at least one processor is further configured to, while in the second mode:
  detect actuation of one of the additional user interface elements;
  store data for initiating the action associated with the actuated additional user interface element; and
  on detection of a trigger, provide a request to a dedicated application to execute the action on the communication event corresponding to the additional user interface element, the dedicated application being associated with the communication event type or account of the communication event, the trigger comprising either:
    actuation of another user interface element in the view; or
    a command to invoke the first mode in place of the second mode.

* * * * *